US012150131B2

(12) United States Patent
Yerramalli et al.

(10) Patent No.: US 12,150,131 B2
(45) Date of Patent: Nov. 19, 2024

(54) TECHNIQUES FOR CONFIGURING UPLINK CONTROL CHANNEL TRANSMISSIONS IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/669,942

(22) Filed: Feb. 11, 2022

(65) Prior Publication Data

US 2022/0174664 A1    Jun. 2, 2022

Related U.S. Application Data

(63) Continuation of application No. 16/418,280, filed on May 21, 2019, now Pat. No. 11,252,703, which is a
(Continued)

(51) Int. Cl.
*H04W 72/21*    (2023.01)
*H04L 1/1829*    (2023.01)
(Continued)

(52) U.S. Cl.
CPC .......... *H04W 72/21* (2023.01); *H04L 1/1864* (2013.01); *H04L 5/001* (2013.01); *H04L 5/0041* (2013.01);
(Continued)

(58) Field of Classification Search
None
See application file for complete search history.

(56) References Cited

U.S. PATENT DOCUMENTS

| 8,611,238 B2 | 12/2013 | Papsakellariou et al. |
| 10,356,761 B2 | 7/2019 | Yerramalli et al. |
| (Continued) | | |

FOREIGN PATENT DOCUMENTS

| CN | 102598760 A | 7/2012 |
| CN | 104012159 A | 8/2014 |
| (Continued) | | |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification ( Release 13)", Draft_36331-D10_Update1_With_Rev_Marks, Mar. 26, 2016, XP051081600, Retrieved from the Internet: URL:http://www.3gpp.org/ftp/tsg_ran/WG2_RL2/Specifications/201603_draft_specs_after_RAN_71/, pp. 329.
(Continued)

*Primary Examiner* — Shripal K Khajuria
(74) *Attorney, Agent, or Firm* — Dalei Dong; Holland & Hart LLP

(57) ABSTRACT

Uplink control channel transmission in a shared radio frequency spectrum band may be transmitted using different uplink resources UCI based on a format of uplink control information (UCI) to be transmitted in the uplink control channel transmission. Different time resources, frequency resources, or combinations thereof, for the transmission of UCI by a UE may be provided by a base station and selected by the UE based on a UCI format. The resources to be used for UCI transmission may semi-statically configured, or dynamically indicated to a UE. Uplink transmissions may be configured in interlaces of frequency resources, with each
(Continued)

interlace having one or more segments, and a base station may configure different segments for transmission of different format UCI. In some cases, different subframes, or different component carriers, may be configured for different formats of UCI.

30 Claims, 18 Drawing Sheets

Related U.S. Application Data continuation of application No. 15/471,524, filed on Mar. 28, 2017, now Pat. No. 10,356,761.

(60) Provisional application No. 62/315,626, filed on Mar. 30, 2016.

(51) Int. Cl.
| | |
|---|---|
| *H04L 5/00* | (2006.01) |
| *H04W 72/0446* | (2023.01) |
| *H04W 72/23* | (2023.01) |
| *H04W 72/542* | (2023.01) |
| *H04W 16/14* | (2009.01) |
| *H04W 24/10* | (2009.01) |

(52) U.S. Cl.
CPC .......... *H04L 5/0053* (2013.01); *H04L 5/0055* (2013.01); *H04L 5/0057* (2013.01); *H04L 5/0094* (2013.01); *H04W 72/0446* (2013.01); *H04W 72/23* (2023.01); *H04W 72/542* (2023.01); *H04W 16/14* (2013.01); *H04W 24/10* (2013.01)

(56) References Cited

U.S. PATENT DOCUMENTS

| | | | |
|---|---|---|---|
| 2009/0257390 A1* | 10/2009 | Ji | H04W 72/541 370/329 |
| 2011/0228863 A1 | 9/2011 | Papasakellariou et al. | |
| 2012/0294252 A1 | 11/2012 | Kwon et al. | |
| 2013/0107836 A1 | 5/2013 | Miki et al. | |
| 2013/0114450 A1* | 5/2013 | Xu | H04W 72/27 370/336 |
| 2013/0121270 A1 | 5/2013 | Chen et al. | |
| 2013/0121301 A1 | 5/2013 | Kim et al. | |
| 2014/0010179 A1 | 1/2014 | Lee | |
| 2014/0293843 A1 | 10/2014 | Papasakellariou et al. | |
| 2016/0036578 A1 | 2/2016 | Malladi et al. | |
| 2016/0037352 A1 | 2/2016 | Wei et al. | |
| 2017/0064721 A1 | 3/2017 | Noh et al. | |
| 2017/0273091 A1 | 7/2017 | Noh et al. | |
| 2017/0289993 A1 | 10/2017 | Yerramalli et al. | |
| 2019/0274136 A1 | 9/2019 | Yerramalli et al. | |

FOREIGN PATENT DOCUMENTS

| | | |
|---|---|---|
| CN | 104836641 A | 8/2015 |
| WO | WO-2010141913 A2 * | 6/2010 |
| WO | WO2010148319 A1 | 12/2010 |
| WO | WO2016019243 A1 | 2/2016 |
| WO | WO2016022305 A1 | 2/2016 |

OTHER PUBLICATIONS

International Preliminary Report on Patentability—PCT/US2017/024658, The International Bureau of WIPO—Geneva, Switzerland, Oct. 11, 2018.
International Search Report and Written Opinion—PCT/US2017/024658—ISA/EPO—Aug. 29, 2017.
Nokia, et al., "Existing Downlink Signals for OTDOA Positioning in NB-IoT", 3GPP TSG RAN WG1 Meeting #86bis, 3GPP Draft, R1-1608881, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016, 3 Pages, XP051148935, Retrieved from the Internet: URL: http://www.3gpp.org/ftp/tsg_ran/WG1_RL1/TSGR1_86b/Docs/R1-1608881.zip [retrieved on Oct. 9, 2016].
Partial International Search Report—PCT/US2017/024658—ISA/EPO—Jul. 4, 2017.
Qualcomm Incorporated: "PUCCH Design Details". 3GPP Draft; R1-160888, 3GPP TSG RAN WG1 #84, PUCCH Design Details. 3rd Generation Partnership Project (3GPP). Mobile Competence Centre ; 650. Route Des Lucioles ; F-06921, Sophia-Antipolis Cedex, France, Feb. 15-19, 2016, 3 Pages, URL: http://www.3gpp.org/ftp/tsg_ran/WG1_RL1/TSGR1_84/Docs/R1-160888.zip.

* cited by examiner

TECHNIQUES FOR CONFIGURING UPLINK CONTROL CHANNEL TRANSMISSIONS IN A SHARED RADIO FREQUENCY SPECTRUM BAND

CROSS REFERENCES

The present Application for Patent is a Continuation of U.S. patent application Ser. No. 16/418,280 by Yerramalli et al., entitled "Techniques For Configuring Uplink Control Channel Transmissions in a Shared Radio Frequency Spectrum Band" filed May 21, 2019, which is a Continuation of U.S. patent application Ser. No. 15/471,524 by Yerramalli, et al., entitled "Techniques For Configuring Uplink Control Channel Transmissions in a Shared Radio Frequency Spectrum Band" filed Mar. 28, 2017, which claims priority to U.S. Provisional Patent Application No. 62/315,626 by Yerramalli, et al., entitled "Techniques For Configuring Uplink Control Channel Transmissions In A Shared Radio Frequency Spectrum Band," filed Mar. 30, 2016, each of which is assigned to the assignee hereof, and each of which is hereby expressly incorporated by reference herein in its entirety.

BACKGROUND

The present disclosure, for example, relates to wireless communication systems, and more particularly to techniques for configuring uplink control channel transmissions in a shared radio frequency spectrum band.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band, or over different spectrums (e.g., a dedicated radio frequency spectrum band and a shared radio frequency spectrum band). With increasing data traffic in cellular networks that use a dedicated radio frequency spectrum band, offloading of at least some data traffic to a shared radio frequency spectrum band may provide a mobile network operator (or cellular operator) with opportunities for enhanced data transmission capacity. Use of a shared radio frequency spectrum band may also provide service in areas where access to a dedicated radio frequency spectrum band is unavailable.

In order to provide information to a base station about one or more UE parameters (e.g., channel parameters, UE buffer status, scheduling requests, acknowledgment receipt feedback), a UE may transmit uplink control information (UCI) using a physical uplink control channel (PUCCH). Efficient transmission if such UCI may enhance network utilization.

SUMMARY

When a transmitting an uplink control channel transmission in a shared radio frequency spectrum band, resources may be configured for the uplink control channel transmission using techniques that provide different resources for uplink control information (UCI) based on a format configured for the UCI. Techniques described in the present disclosure may provide different time resources, frequency resources, or combinations thereof, for the transmission of UCI by a UE. The particular resources to be used by a UE may be configured by a base station and provided to a UE. In some examples, the resources to be used for UCI transmission may be semi-statically configured, or dynamically indicated to a UE. In some examples, uplink transmissions may be configured in interlaces of frequency resources, with each interlace having one or more segments, and a base station may configure different segments for transmission of different format UCI. In other examples, different subframes, or different component carriers, may be configured for different formats of UCI.

A method of wireless communication is described. The method may include identifying a UCI format for transmitting UCI using an uplink control channel transmission, identifying, based at least in part on the identified UCI format, a first subset of uplink control channel resources from a set of configured uplink control channel resources, the set of configured uplink control channel resources includes a plurality of subsets of uplink control channel frequency resources, a plurality of subsets of uplink control channel time resources, or combinations thereof, and wherein different subsets of the set of configured uplink control channel resources correspond to different UCI formats and communicating the UCI using the first subset of uplink control channel resources.

An apparatus for wireless communication is described. The apparatus may include means for identifying a UCI format for transmitting UCI using an uplink control channel transmission, means for identifying, based at least in part on the identified UCI format, a first subset of uplink control channel resources from a set of configured uplink control channel resources, the set of configured uplink control channel resources includes a plurality of subsets of uplink control channel frequency resources, a plurality of subsets of uplink control channel time resources, or combinations thereof, and wherein different subsets of the set of configured uplink control channel resources correspond to different UCI formats and means for communicating the UCI using the first subset of uplink control channel resources.

A further apparatus is described. The apparatus may include a processor, memory in electronic communication with the processor, and instructions stored in the memory. The instructions may be operable to cause the processor to identify a UCI format for transmitting UCI using an uplink control channel transmission, identify, based at least in part on the identified UCI format, a first subset of uplink control channel resources from a set of configured uplink control channel resources, the set of configured uplink control channel resources includes a plurality of subsets of uplink control channel frequency resources, a plurality of subsets of uplink control channel time resources, or combinations thereof, and wherein different subsets of the set of configured uplink control channel resources correspond to different UCI formats and communicate the UCI using the first subset of uplink control channel resources.

A non-transitory computer readable medium for wireless communication is described. The non-transitory computer-readable medium may include instructions to cause a processor to identify a UCI format for transmitting UCI using an uplink control channel transmission, identify, based on the identified UCI format, a first subset of uplink control channel resources from a set of configured uplink control channel resources, the set of configured uplink control channel resources includes a set of subsets of uplink control channel frequency resources, a set of subsets of uplink control channel time resources, or combinations thereof, and where different subsets of the set of configured uplink control channel resources correspond to different UCI formats and communicate the UCI using the first subset of uplink control channel resources.

In some examples of the method, apparatus, or non-transitory computer-readable medium described above, the set of configured uplink control channel resources comprises a first set of frequency resource interlaces and a first set of frequency resource interlace segments, each frequency resource interlace segment of the first set of frequency resource interlace segments comprises a portion of resources of the frequency resource interlaces of the first set of frequency resource interlaces, and where identifying the first subset of uplink control channel resources comprises identifying a first subset of the first set of frequency resource interlace segments based on the identified UCI format.

In some examples of the method, apparatus, or non-transitory computer-readable medium described above, the set of configured uplink control channel resources comprises a subset of uplink control channel resources of a set of subframes, the subset of uplink control channel resources for different subframes being configured for different UCI formats, and where identifying the first subset of uplink control channel resources comprises identifying a first subset of the first set of uplink control channel of a first subframe based on the identified UCI format.

In some examples of the method, apparatus, or non-transitory computer-readable medium described above, the set of configured uplink control channel resources comprises a subset of uplink control channel resources of a set of uplink component carriers, the subset of uplink control channel resources for different component carriers being configured for different UCI formats, and where identifying the first subset of uplink control channel resources comprises identifying a first subset of the first set of uplink control channel of a first component carrier based on the identified UCI format.

Some examples of the method, apparatus, or non-transitory computer-readable medium described above may further include processes, features, means, or instructions for receiving a first uplink grant for the first uplink control channel transmission, the first uplink grant including an allocation of the first subset of uplink control channel resources, and where communicating the UCI comprises transmitting the UCI using the first subset of uplink control channel resources allocated in the first uplink grant.

Some examples of the method, apparatus, or non-transitory computer-readable medium described above may further include processes, features, means, or instructions for receiving signaling indicating the UCI format for transmitting the UCI, wherein communicating the UCI comprises transmitting the UCI using the indicated UCI format.

In some examples of the method, apparatus, or non-transitory computer-readable medium described above, the signaling is received in physical downlink control channel (PDCCH) signaling or in an uplink grant.

Some examples of the method, apparatus, or non-transitory computer-readable medium described above may further include processes, features, means, or instructions for identifying a scheduling request (SR) to be transmitted using a primary component carrier in a first subframe. Some examples of the method, apparatus, or non-transitory computer-readable medium described above may further include processes, features, means, or instructions for dropping the transmission of the SR using the primary component carrier based on identifying that a buffer status report (BSR) is to be included in the UCI and transmitted using the first subset of uplink control channel resources of a secondary component carrier in the first subframe.

Some examples of the method, apparatus, or non-transitory computer-readable medium described above may further include processes, features, means, or instructions for identifying periodic channel state information (CSI) is to be included in the UCI and transmitted in a first subframe. Some examples of the method, apparatus, or non-transitory computer-readable medium described above may further include processes, features, means, or instructions for identifying that aperiodic CSI is to be transmitted during the first subframe using different resources than the first subset of uplink control channel resources. Some examples of the method, apparatus, or non-transitory computer-readable medium described above may further include processes, features, means, or instructions for dropping the periodic CSI from the UCI based on a size of the payload of the periodic CSI.

Some examples of the method, apparatus, or non-transitory computer-readable medium described above may further include processes, features, means, or instructions for identifying a number of hybrid automatic repeat request (HARQ) feedback bits to be included in the UCI based on a number of configured component carriers, a number of HARQ processes per component carrier, or any combination thereof. In some examples of the method, apparatus, or non-transitory computer-readable medium described above, the first set of resources is in a shared radio frequency spectrum band.

A method of wireless communication is described. The method may include identifying a plurality of different UCI formats for transmitting UCI in an uplink control channel transmission, configuring, for each of the plurality of different UCI formats, a different subset of uplink control channel resources from a set of uplink control channel resources, wherein each subset of uplink control channel resources comprises a subset of uplink control channel frequency resources, a subset of uplink control channel time resources, or combinations thereof and communicating the configured subsets of uplink control channel resources to one or more receivers.

An apparatus for wireless communication is described. The apparatus may include means for identifying a plurality of different UCI formats for transmitting UCI in an uplink control channel transmission, means for configuring, for each of the plurality of different UCI formats, a different subset of uplink control channel resources from a set of uplink control channel resources, wherein each subset of uplink control channel resources comprises a subset of uplink control channel frequency resources, a subset of uplink control channel time resources, or combinations thereof and means for communicating the configured subsets of uplink control channel resources to one or more receivers.

A further apparatus is described. The apparatus may include a processor, memory in electronic communication with the processor, and instructions stored in the memory. The instructions may be operable to cause the processor to identify a plurality of different UCI formats for transmitting UCI in an uplink control channel transmission, configure, for each of the plurality of different UCI formats, a different subset of uplink control channel resources from a set of uplink control channel resources, wherein each subset of uplink control channel resources comprises a subset of uplink control channel frequency resources, a subset of uplink control channel time resources, or combinations thereof and communicate the configured subsets of uplink control channel resources to one or more receivers.

A non-transitory computer readable medium for wireless communication is described. The non-transitory computer-readable medium may include instructions to cause a processor to identify a set of different UCI formats for transmitting UCI in an uplink control channel transmission, configure, for each of the set of different UCI formats, a different subset of uplink control channel resources from a set of uplink control channel resources, where each subset of uplink control channel resources comprises a subset of uplink control channel frequency resources, a subset of uplink control channel time resources, or combinations thereof and communicate the configured subsets of uplink control channel resources to one or more receivers.

In some examples of the method, apparatus, or non-transitory computer-readable medium described above, each subset of uplink control channel resources comprises a set of frequency resource interlaces and a set of frequency resource interlace segments, each frequency resource interlace segment of the set of frequency resource interlace segments comprises a portion of resources of the frequency resource interlaces of the set of frequency resource interlaces.

In some examples of the method, apparatus, or non-transitory computer-readable medium described above, each subset of uplink control channel resources comprises a subset of uplink control channel resources of different subframes of a set of subframes, and where configuring the different subsets of uplink control channel resources includes configuring the subset of uplink control channel resources for the different subframes for different UCI formats.

In some examples of the method, apparatus, or non-transitory computer-readable medium described above, each subset of uplink control channel resources comprises a subset of uplink control channel resources of different component carriers, and where configuring the different subsets of uplink control channel resources includes configuring the subset of uplink control channel resources for the different component carriers for different UCI formats.

Some examples of the method, apparatus, or non-transitory computer-readable medium described above may further include processes, features, means, or instructions for configuring the one or more receivers to drop a SR transmission using a primary component carrier in a first subframe based on an identification that a BSR is to be included in the UCI and transmitted in the first subframe.

Some examples of the method, apparatus, or non-transitory computer-readable medium described above may further include processes, features, means, or instructions for configuring the one or more receivers to drop periodic CSI from the UCI during a first subframe based on a payload size of the periodic CSI and an identification that aperiodic CSI is to be transmitted during the first subframe using different resources than the configured subset of uplink control channel resources.

In some examples of the method, apparatus, or non-transitory computer-readable medium described above, the set of uplink control channel resources is in a shared radio frequency spectrum band.

A method of wireless communication is described. The method may include identifying a plurality of different UCI formats for transmitting UCI in an uplink control channel transmission, configuring a first set of uplink control channel resources of a first transmission time interval (TTI) for a first UCI format and a second set of uplink control channel resources of a second TTI for a second UCI format, identifying at least a first user equipment (UE) that is to transmit using the first UCI format and a second UE that is to transmit using the second UCI format and triggering the first UE to transmit during the first TTI and the second UE to transmit during the second TTI.

An apparatus for wireless communication is described. The apparatus may include means for identifying a plurality of different UCI formats for transmitting UCI in an uplink control channel transmission, means for configuring a first set of uplink control channel resources of a first TTI for a first UCI format and a second set of uplink control channel resources of a second TTI for a second UCI format, means for identifying at least a first user equipment (UE) that is to transmit using the first UCI format and a second UE that is to transmit using the second UCI format and means for triggering the first UE to transmit during the first TTI and the second UE to transmit during the second TTI.

A further apparatus is described. The apparatus may include a processor, memory in electronic communication with the processor, and instructions stored in the memory. The instructions may be operable to cause the processor to identify a plurality of different UCI formats for transmitting UCI in an uplink control channel transmission, configure a first set of uplink control channel resources of a first TTI for a first UCI format and a second set of uplink control channel resources of a second TTI for a second UCI format, identify at least a first user equipment (UE) that is to transmit using the first UCI format and a second UE that is to transmit using the second UCI format and trigger the first UE to transmit during the first TTI and the second UE to transmit during the second TTI.

A non-transitory computer readable medium for wireless communication is described. The non-transitory computer-readable medium may include instructions to cause a processor to identify a set of different UCI formats for transmitting UCI in an uplink control channel transmission, configure a first set of uplink control channel resources of a first TTI for a first UCI format and a second set of uplink control channel resources of a second TTI for a second UCI format, identify at least a first user equipment (UE) that is to transmit using the first UCI format and a second UE that is to transmit using the second UCI format and trigger the first UE to transmit during the first TTI and the second UE to transmit during the second TTI.

In some examples of the method, apparatus, or non-transitory computer-readable medium described above, the first subset of uplink control channel resources and the second subset of control channel resources correspond to a same set of frequency resource interlaces and set of frequency resource interlace segments within the first TTI and the second TTI, where each frequency resource interlace segment of the set of frequency resource interlace segments comprises a portion of resources of the frequency resource interlaces of the set of frequency resource interlaces.

In some examples of the method, apparatus, or non-transitory computer-readable medium described above, triggering the first UE to transmit during the first TTI and the second UE to transmit during the second TTI comprises: transmitting a first uplink grant to the first UE for uplink transmission in the first TTI. Some examples of the method, apparatus, or non-transitory computer-readable medium described above may further include processes, features, means, or instructions for transmitting a second uplink grant to the second UE for uplink transmission in the second TTI.

A method of wireless communication is described. The method may include identifying a plurality of different UCI formats for transmitting UCI in an uplink control channel transmission, configuring at least a first UE to use a first UCI format for transmitting UCI and communicating the configuration to the first UE to use the first UCI format.

An apparatus for wireless communication is described. The apparatus may include means for identifying a plurality of different UCI formats for transmitting UCI in an uplink control channel transmission, means for configuring at least a first UE to use a first UCI format for transmitting UCI and means for communicating the configuration to the first UE to use the first UCI format.

A further apparatus is described. The apparatus may include a processor, memory in electronic communication with the processor, and instructions stored in the memory. The instructions may be operable to cause the processor to identify a plurality of different UCI formats for transmitting UCI in an uplink control channel transmission, configure at least a first UE to use a first UCI format for transmitting UCI and communicate the configuration to the first UE to use the first UCI format.

A non-transitory computer readable medium for wireless communication is described. The non-transitory computer-readable medium may include instructions to cause a processor to identify a set of different UCI formats for transmitting UCI in an uplink control channel transmission, configure at least a first UE to use a first UCI format for transmitting UCI and communicate the configuration to the first UE to use the first UCI format.

In some examples of the method, apparatus, or non-transitory computer-readable medium described above, communicating the configuration to the first UE comprises: transmitting common signaling to the first UE and one or more other UEs that UCI is to be transmitted using the first UCI format. Some examples of the method, apparatus, or non-transitory computer-readable medium described above may further include processes, features, means, or instructions for communicating the common signaling is PDCCH signaling transmitted to a set of UEs.

In some examples of the method, apparatus, or non-transitory computer-readable medium described above, communicating the configuration to the first UE comprises: transmitting an uplink grant to the first UE that indicates that UCI is to be transmitted using the first UCI format. In some examples of the method, apparatus, or non-transitory computer-readable medium described above, configuring at least the first UE to use the first UCI format for transmitting UCI further comprises: prohibiting the first UE from using UCI formats of the set of different UCI formats other than the first UCI format.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described in which a shared radio frequency spectrum band may be used for at least a portion of communications in a wireless communication system. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner.

In some examples, a user equipment (UE) may be configured to transmit uplink control channel transmissions in a shared radio frequency spectrum band, and resources may be configured for the uplink control channel transmissions based on one or more formats of uplink control information (UCI) that are to be transmitted. In some examples, a base station may provide different time resources, frequency resources, or combinations thereof, for the transmission of UCI by a UE. The particular resources to be used by a UE may be configured by a base station and provided to a UE. In some examples, the resources to be used for UCI transmission may semi-statically configured, or dynamically indicated to a UE. In some examples, uplink transmissions may be configured in interlaces of frequency resources, with each interlace having one or more segments, and a base station may configure different segments for transmission of different format UCI. In other examples, different subframes, or different component carriers, may be configured for different formats of UCI.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
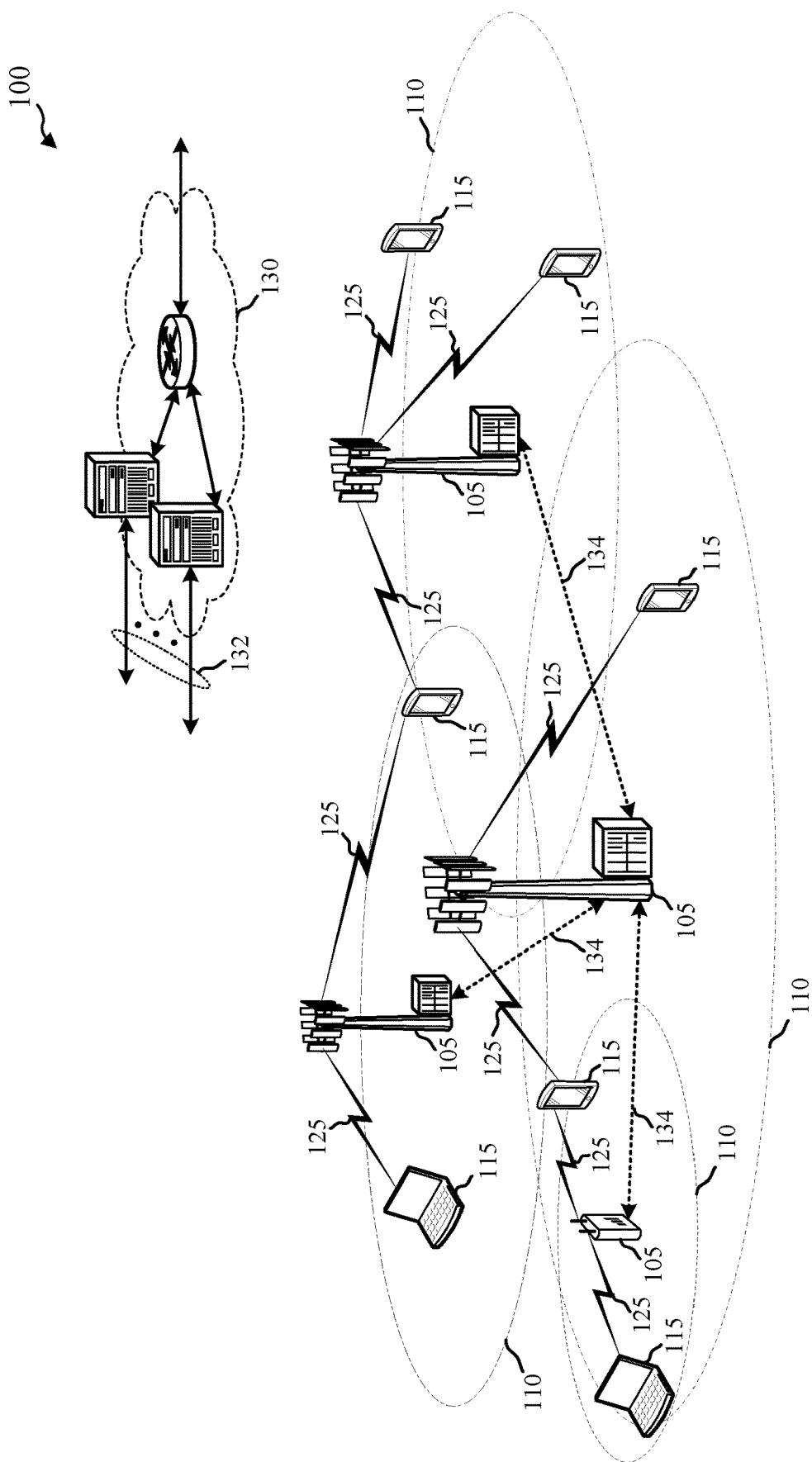
FIG. 1 illustrates an example of a wireless communications system that supports uplink control channel transmissions in a shared radio frequency spectrum band in accordance with aspects of the present disclosure.

FIG. 1 illustrates an example of a wireless communications system that supports uplink control channel transmissions in a shared radio frequency spectrum band in accordance with aspects of the present disclosure. The wireless communication system 100 may include network access devices (e.g., base stations 105), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more communications links 125. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE-U) radio access technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures, such as a clear channel assessment (CCA), to ensure the channel is clear before transmitting data. In some cases, operations in unlicensed bands may be based on a carrier aggregation (CA) configuration in conjunction with component carriers (CCs) operating in a licensed band. A component carrier may also be referred to as a layer, a channel, etc., and the terms "carrier," "component carrier," "cell," and "channel" may be used interchangeably herein.

When configured for CA operations, the wireless communication system 100 may, in some examples, use FDD or TDD component carriers. In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as an uplink (UL) CC. Also, one of the CCs allocated to a UE 115 may be configured as a primary CC (PCC) or a primary cell (PCell) CC, and the remaining CCs allocated to the UE 115 may be configured as secondary CCs (SCCs) or secondary cell (SCell) CCs.

Operations in unlicensed spectrum may include downlink transmissions, uplink transmissions, or both. Duplexing in unlicensed spectrum may be based on frequency division duplexing (FDD), time division duplexing (TDD) or a combination of both. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In some cases, wireless communications system 100 may utilize enhanced CCs (eCC). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum. An eCC characterized by wide bandwidth may include one or more segments that may be utilized by UEs 115 that do are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration may be associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 µs). A TTI in eCC may include one or multiple symbols. In some cases, the TTI duration (i.e., the number of symbols in a TTI) may be variable.

In some cases, a CC may be an uplink CC and may be used to convey physical uplink control channel (PUCCH) information. In some systems configured for eCC, multiple uplink carriers may be divided into two groups for the purpose of carrying PUCCH, namely a PCell CC and one or more SCell CCs. In some examples, there is no cross-carrier scheduling across PUCCH groups, and PUCCH on Scell may carry hybrid automatic repeat request (HARQ) acknowledgment/negative-acknowledgment (ACK/NACK) information, channel state information (CSI), scheduling request (SR) information, or any combination thereof. Furthermore, radio resource control (RRC) parameters may be independent for both groups of uplink CCs, and UE 115 procedures for PUCCH resource/payload determination and transmission may be independent across both groups. Various parameters may be configured for inclusion in UCI, as well as for transmission of UCI using PUCCH resources. Such parameters may include, for example, transmit power control (TPC) parameters for PUCCH on SCell, rules for prioritizing PUCCH transmissions in power limited situations, UCI multiplexing and aperiodic CSI multiplexing, HARQ feedback parameters, SR transmission parameters, CSI reporting parameters, or any combination thereof. In some cases, eCC UCI information may be provided using a specified PUCCH format, and a UE 115 may select a PUCCH format based on particular UCI to be transmitted and the configured UCI parameters. For example, for a UE 115 configured with a dynamic HARQ feedback codebook and identified PUCCH formats (e.g., PUCCH format 4 or 5 as defined in LTE standards), and for transmission of ACK/SR only, if the UCI payload is smaller than 22 bits then PUCCH format 3 may be used; and if the UCI payload is larger than 22 bits then PUCCH format 4 or 5 may be used. A base station 105 thus may not have prior knowledge of a particular UCI format that a UE 115 may use. Various aspects of the present disclosure provide techniques for configuring particular resources for particular UCI formats.

Figure 2:
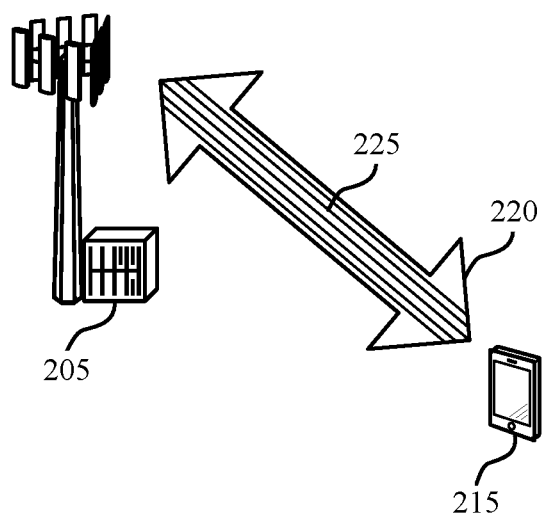
FIG. 2 illustrates an example of a wireless communications system that supports uplink control channel transmissions in a shared radio frequency spectrum band in accordance with aspects of the present disclosure.

FIG. 2 illustrates an example of a wireless communications system 200 that supports uplink control channel transmissions in a shared radio frequency spectrum band in accordance with aspects of the present disclosure. The wireless communications system 200 may be an example of portions of the wireless communication system 100 described with reference to FIG. 1. Moreover, a base station 205 may be an example of aspects of one or more of the base stations 105 described with reference to FIG. 1, while a UE 215 may be an example of aspects of one or more of the UEs 115 described with reference to FIG. 1.

In the example of FIG. 2, UE 215 and base station 205 may communicate via communications link 220, which may include multiple CCs 225. The multiple CCs 225 may include multiple uplink CCs, multiple downlink CCs, or combinations thereof. The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers. In some examples, base station 205 may identify a number of different UCI formats for transmitting UCI in an uplink CCs. For each of the different UCI formats, the base station 205 may configure a different subset of uplink control channel (e.g., PUCCH) resources. In some examples, each subset of uplink control channel resources may be a subset of control channel frequency resources. In some examples, the subsets of control channel frequency resources may correspond to different uplink CCs. In some examples, each subset of uplink control channel frequency resources may be a subset resource interlace segments of a set of frequency resource interlaces, as will be discussed in more detail below. In other examples, each subset of uplink control channel resources may be a subset of uplink control channel time resources, such as uplink control channel resources of different subframes.

The base station 205 may, in some examples, communicate the configured subsets of uplink control channel resources to the UE 215 (and other UEs that may be within the base station 205 coverage area). Such configured subsets may be configured by the base station 205 when a connection is established with the UE 215, or may be configured semi-statically.

In some examples, the base station 205 may configure UCI formats on a per-TTI basis, with different UCI formats transmitted using the same PUCCH resources in different TTIs. In such cases, the base station 205 may identify a type of UCI that UE 215 will use (e.g., based on information associated with the UE 215 such as number of HARQ processes, CSI, etc.) and may trigger the UE 215 to report UCI during a TTI that is configured for the identified UCI format. In some examples, the base station 205 may trigger the UE 215 through providing an uplink grant to the UE 215 during a TTI having the UCI type identified for the UE 215. In other examples, the base station 205 may dynamically indicate to the UE 215 the format to be used for the DCI in the PUCCH transmission, such as through common signaling in a PDCCH transmission or in dedicated signaling such as a PUCCH trigger grant. In some other examples, the base station 205 may only configure one UCI format and not allow the UE 215 to use any other type of UCI format. The UE 215, based on the configured UCI formats, may select appropriate PUCCH resources and may transmit the UCI in uplink transmissions on one or more CCs.

Figure 3:
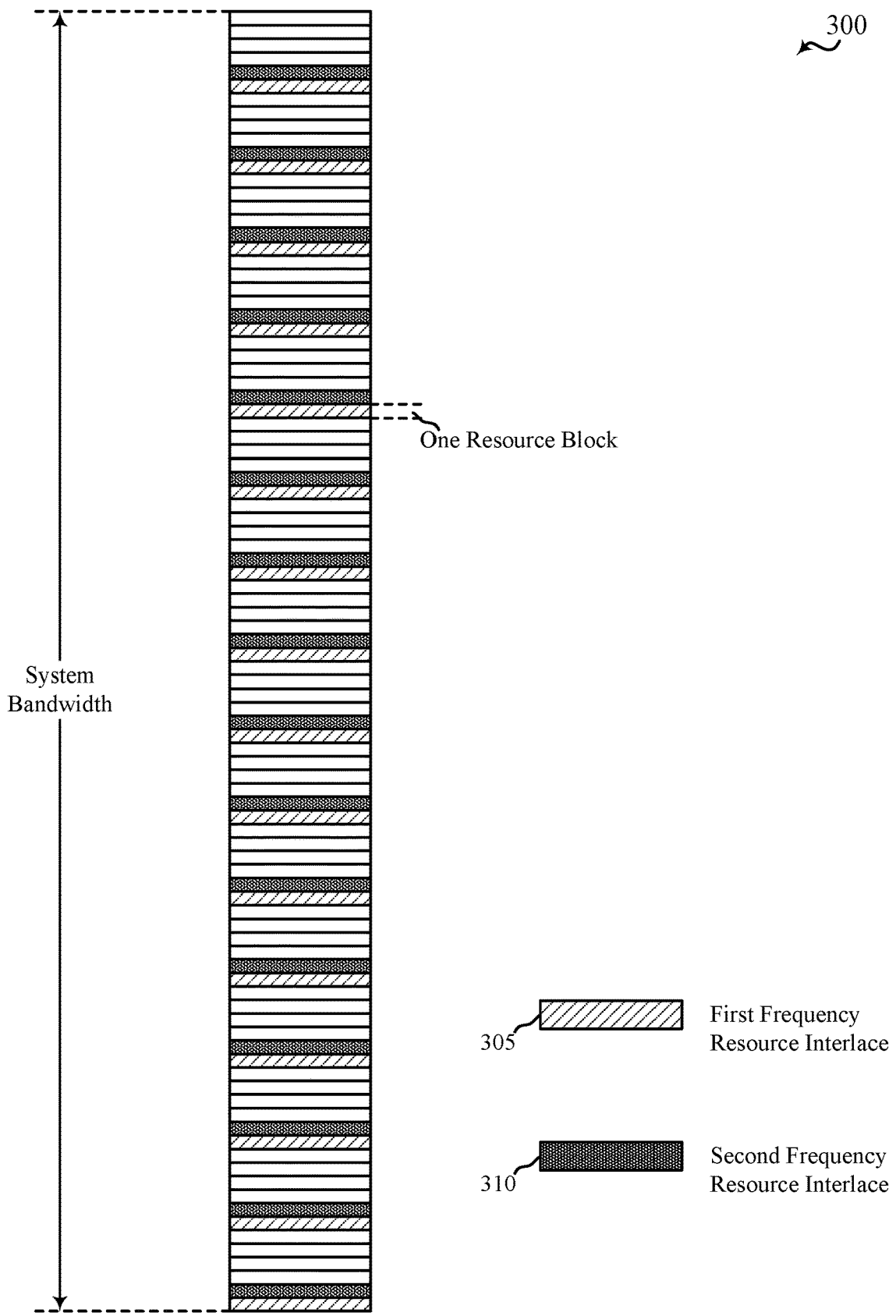
FIG. 3 shows a plurality of resource blocks of a system bandwidth, which may be allocated in a plurality of frequency resource interlaces, in accordance with various aspects of the present disclosure.

FIG. 3 shows a plurality of resource blocks 300 of a system bandwidth, which may be allocated in a plurality of frequency resource interlaces, in accordance with various aspects of the present disclosure. A set of the resource blocks may be allocated for transmission in each of a number of transmission time intervals (TTIs) in a radio frame, a transmission burst, or a transmission opportunity. In a downlink TTI (e.g., a downlink subframe), a set of the resource blocks may be allocated for downlink transmission (i.e., transmissions from a base station to a number of UEs, such as physical downlink shared channel (PDSCH) transmissions or physical downlink control channel (PDCCH) transmissions). In an uplink TTI (e.g., an uplink subframe), a set of the resource blocks may be allocated for uplink transmissions (e.g., transmissions from a number of UEs to a base station, such physical uplink shared channel (PUSCH) transmissions, PUCCH transmissions, physical random access channel (PRACH) transmissions, or sounding reference signal (SRS) transmissions). In some examples, the base station and UEs that communicate using the set of resource blocks may include aspects of the base stations 105 or 205, or UEs 115 or 215, described with reference to FIG. 1 or 2.

By way of example, FIG. 3 shows a system bandwidth (e.g., a bandwidth of a shared radio frequency spectrum band) divided into 96 same size resource blocks. In other examples, the system bandwidth may be divided into 100 or some other number of same size resource blocks. In some examples, each resource block may include a plurality of sub-carriers or tones (e.g., 12 tones). In some examples, the resource blocks may be allocated to UEs for uplink transmissions on an individual basis. In some examples, the resource blocks may be allocated to UEs for uplink transmissions in groups. For example, and as shown, the 96 resource blocks may be divided into six frequency resource interlaces, with each of the frequency resource interlaces including a set of 16 resource blocks. In some examples, each of the frequency resource interlaces may include a set of equally spaced resource blocks (e.g., every sixth resource block within the system bandwidth). FIG. 3 identifies two frequency resource interlaces (e.g., a first frequency resource interlace 305 and a second frequency resource interlace 310) of a set of six frequency resource interlaces.

Allocating a set of resource blocks in a frequency resource interlace to a UE, for an uplink transmission, can assist in meeting a bandwidth occupancy requirement (e.g., an 80% bandwidth occupancy requirement) when not all of the resource blocks (or frequency resource interlaces) are allocated for uplink transmissions. In some examples, segments of frequency resources interlaces may be configured for transmission of UCI, and different segments may be configured for different UCI formats.

Figure 4:
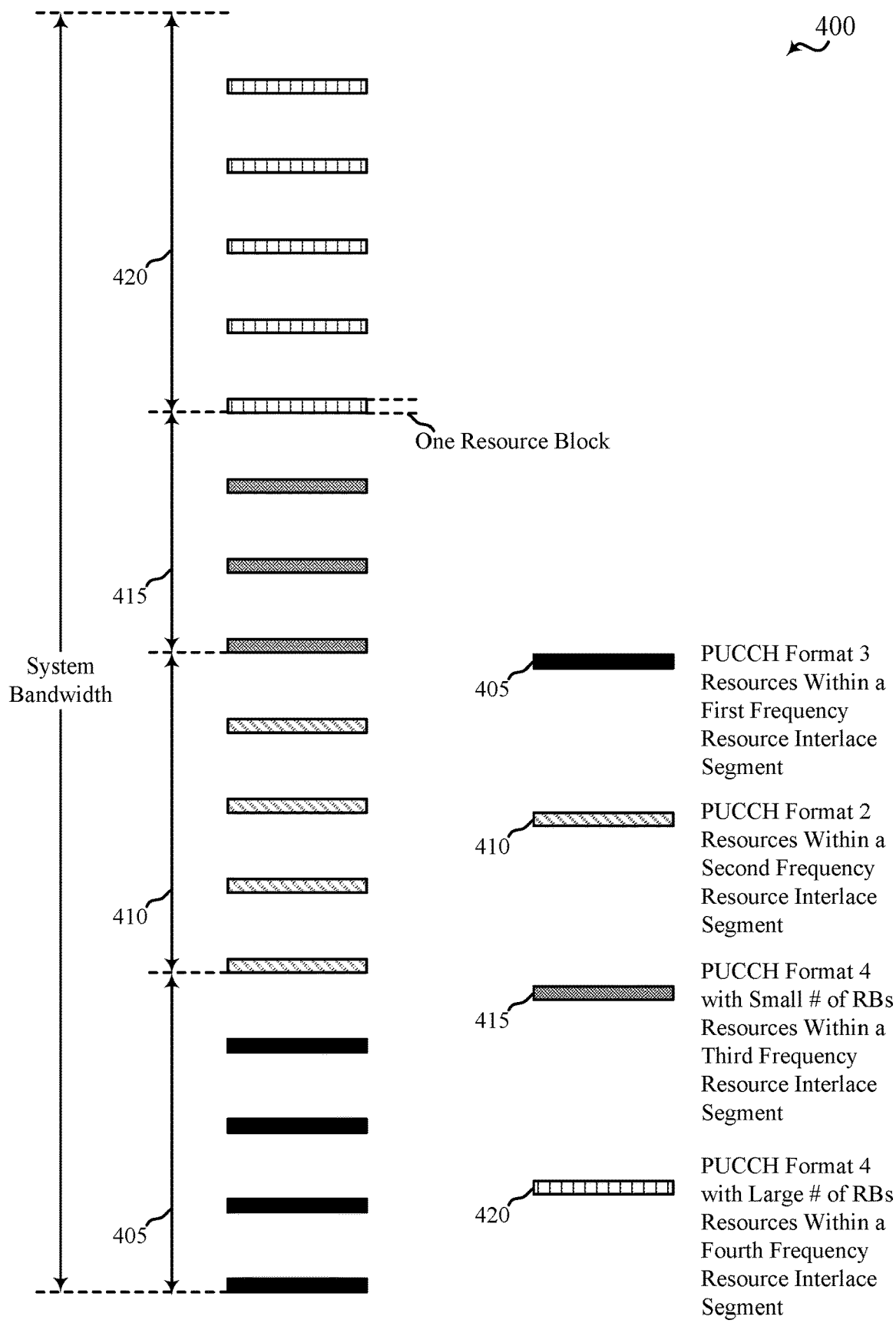
FIG. 4 shows an example of different frequency resource interlace segments that may be used for different formats of UCI, in accordance with various aspects of the present disclosure.

FIG. 4 shows an example of different frequency resource interlace segments 400 that may be used for different formats of UCI, in accordance with various aspects of the present disclosure. In some examples, the frequency resource interlace segments 400 may be segments of the first frequency resource interlace 305 described with reference to FIG. 3.

In the example of FIG. 4, different resource blocks of the frequency resource interlace segments 400 may be configured for different formats of UCI information to be transmitted using the PUCCH. For example, a first subset of resource blocks 405 may form a first frequency resource interlace segment that is allocated for PUCCH format 3 transmissions. A second subset of resource blocks 410 may form a second frequency resource interlace segment that is allocated for PUCCH format 2 transmissions, in this example. In some examples, one or more formats may have multiple segments configured, with different segments selected based on one or more parameters associated with the UCI that is to be transmitted. In the example of FIG. 4, PUCCH format 4 may have multiple segments configured based on a payload size of the DCI. In this examples, a third subset of resource blocks 415 may form a third frequency resource interlace segment that is allocated for PUCCH format 4 transmissions with a small number of RBs, and a fourth subset of resource blocks 420 may form a fourth frequency resource interlace segment that is allocated for PUCCH format 4 transmissions with a large number of RBs. The threshold for a small number of RBs versus a large number of RBs, and thus the threshold for selecting the third subset of resource blocks 415 or the fourth subset of resource blocks 420, may be determined based on a number of RBs allocated for the different segments. Such different segments for a particular format may allow a UE to select resources that are more closely aligned with the payload size of the UCI.

As indicated above, a UE may select PUCCH resources based on a format of UCI that is to be transmitted via PUCCH resources. The UE may be configured with the different allocated resources for the different UCI formats via, for example, RRC signaling. Such a technique may provide for more efficient usage of uplink resources, as frequency resource interlace segments may be allocated to different UCI formats rather than entire frequency resource interlaces (e.g., frequency resource interlace 305 of FIG. 3 being allocated for PUCCH format 3 and frequency resource interlace 310 of FIG. 3 being allocated for PUCCH format 4).

Figure 5:
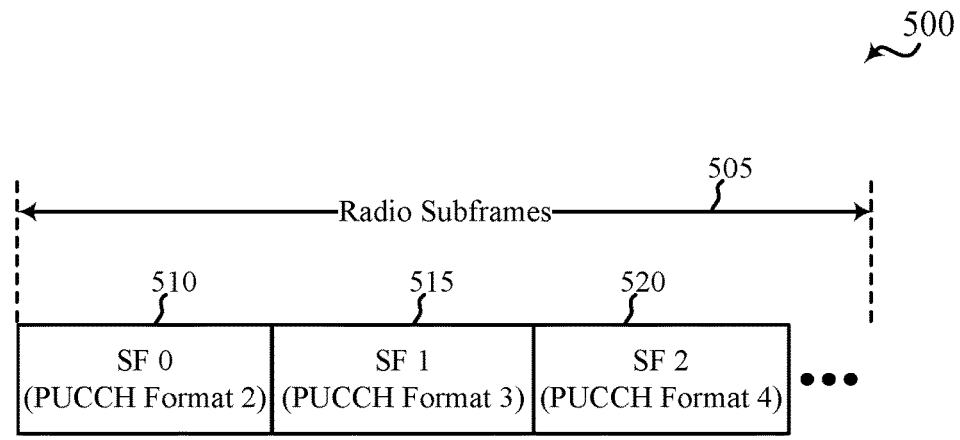
FIG. 5 illustrates an example of subframe based resources that support uplink control channel transmissions in a shared radio frequency spectrum band in accordance with aspects of the present disclosure.

FIG. 5 illustrates an example of subframe-based resources 500 that support uplink control channel transmissions in a shared radio frequency spectrum band in accordance with aspects of the present disclosure. In some cases, subframe-based resources 500 may be allocated according to techniques performed by a UE or base station as described with reference to FIGS. 1-2. Subframe-based resources 500 may represent two or more subsets of uplink control channel time resources that may be allocated to different UCI format transmissions.

In this example, a number of subframes 505 may include subframe 0 510, subframe 1 515, and subframe 2 520. A base station may, for example, allocate PUCCH resources of subframe 0 510 for PUCCH format 2 transmissions, may allocate PUCCH resources of subframe 1 515 for PUCCH format 3 transmissions, and may allocate PUCCH resources of subframe 2 520 for PUCCH format 4 transmissions. Each subframe 505 may correspond, for example to a TTI, and the base station may configure UCI formats on a per-subframe, or per-TTI, basis with different UCI formats for PUCCH transmissions transmitted using the same PUCCH resources in the different subframes 505. In such cases, the base station may identify a type of UCI that a UE will use (e.g., based on information associated with the UE 215 such as number of HARQ processes, CSI, etc.) and may trigger the UE to report UCI during a subframe 505 that corresponds to the identified UCI format. In some examples, a base station may trigger a UE 215 through providing an uplink grant to the UE for the subframe 505 having the UCI type identified for the UE.

Figure 6:
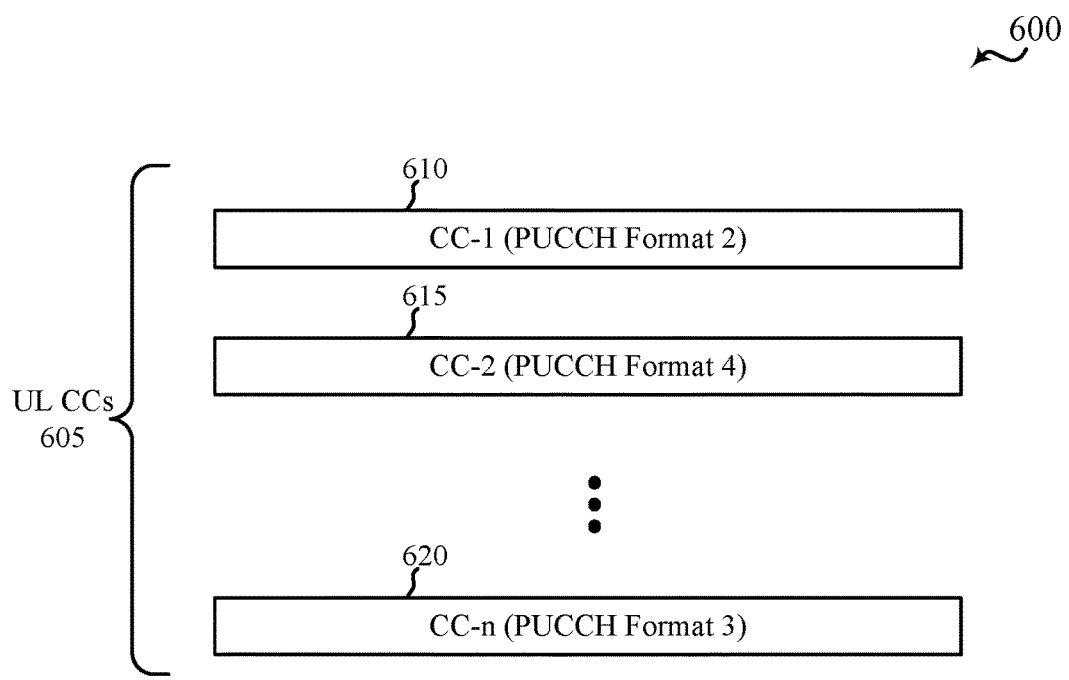
FIG. 6 illustrates an example of carrier-based resources that support uplink control channel transmissions in a shared radio frequency spectrum band in accordance with aspects of the present disclosure.

FIG. 6 illustrates an example of carrier-based resources 600 that support uplink control channel transmissions in a shared radio frequency spectrum band in accordance with aspects of the present disclosure. In some cases, carrier-based resources 600 may be allocated according to techniques performed by a UE or base station as described with reference to FIGS. 1-2. Carrier-based resources 600 may represent two or more subsets of uplink control channel frequency resources that may be allocated to different UCI format transmissions.

In this example, a number of uplink component carriers 605 may include CC-1 610, CC-2 615, and CC-n 620. A base station may, for example, allocate PUCCH resources of CC-1 610 for PUCCH format 2 transmissions, may allocate PUCCH resources of CC-2 615 for PUCCH format 4 transmissions, and may allocate PUCCH resources of CC-n 620 for PUCCH format 3 transmissions. A base station may configure UCI formats on a per-CC 605 basis with different UCI formats for PUCCH transmissions transmitted using PUCCH resources in the different uplink CCs 605. In such cases, the base station may signal which uplink CC 605 corresponds a particular type of UCI, along with PUCCH resources of the uplink CC 605 for the PUCCH transmission. A UE may receive the signaling, identify a UCI format that is to be used for a UCI transmission, and select an uplink CC 605 for transmitting the UCI based on the identified UCI format. In some further examples, a base station may configure only one PUCCH UCI format, and may not allow a UE to use any other UCI format for PUCCH on an SCell.

Figure 7:
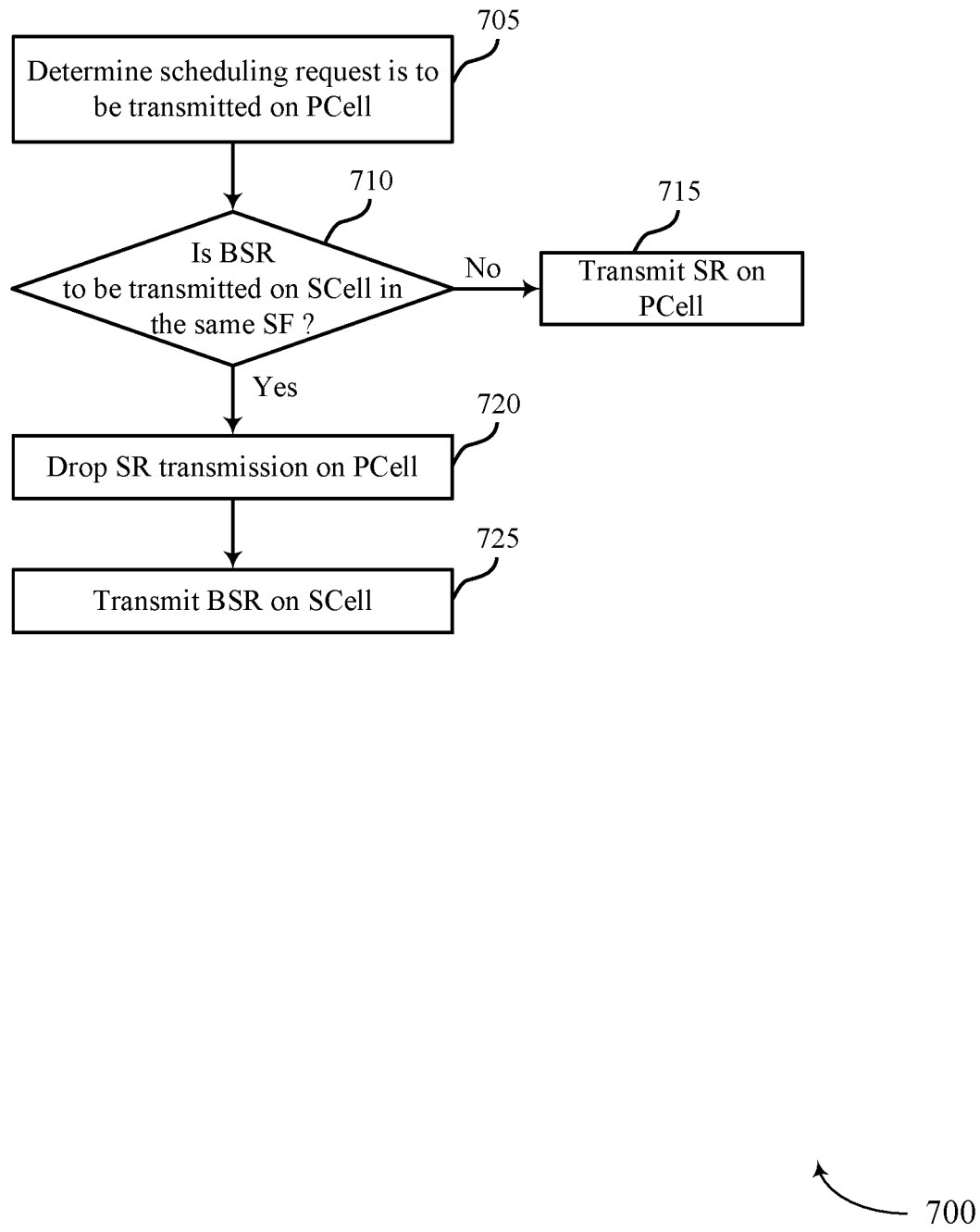
FIG. 7 illustrates an example of a method for payload determination for uplink control channel transmissions in a shared radio frequency spectrum band in accordance with aspects of the present disclosure.

FIG. 7 illustrates an example of a method 700 for payload determination for uplink control channel transmissions in a shared radio frequency spectrum band in accordance with aspects of the present disclosure. In some cases, method 700 may represent aspects of techniques performed by a UE or base station as described with reference to FIGS. 1-2. The operations of method 700 may be implemented by a device such as a UE or its components as described with reference to FIGS. 1 and 2. For example, the operations of method 700 may be performed by the UE UL transmission manager as described herein. In some examples, the UE may execute a set of codes to control the functional elements of the device to perform the functions described below. Additionally or alternatively, the UE may perform aspects the functions described below using special-purpose hardware.

In the example of FIG. 7, a UE may determine BSR or SR data that is to be included as at least a portion of PUCCH payload to be transmitted in a PUCCH transmission. At block 705, the UE may determine that a scheduling request (SR) is to be transmitted on a PCell transmission. In some examples, SRs may be transmitted on PCell transmissions in order to provide SRs with a relatively high priority in order to receive uplink grants for the associated data to be transmitted. At block 710, it is determined whether a buffer status report (BSR) is to be transmitted on an SCell transmission in the same subframe as the SR. If a BSR is not to be transmitted in the same subframe the UE, at block 715, may transmit the SR on the PCell.

If, at block 710, it is determined that a BSR is to be transmitted on an SCell transmission in the same subframe at the SR, the UE may drop the SR transmission on the PCell, as indicated at block 720. At block 725, the UE may transmit the BSR in an SCell transmission. A base station that receives the BSR may use the information in the BSR to determine an amount of data to be transmitted by the UE, and may allocate uplink resources for such transmissions and provide one or more uplink grants to allow the UE to transmit the data. Similarly, if the base station receives a SR from the UE, such as transmitted at block 715, the base station may use information in the scheduling request to provide uplink resources to the UE.

In some examples, the UE may identify other information that is to be included in UCI that is transmitted to a base station using PUCCH resources in one or more CCs. An example of such other information may be HARQ feedback. As indicated above, a UE may provide HARQ feedback to a base station, which may include a number of HARQ feedback bits that identify an ACK/NACK for data transmitted to the UE from the base station. In some examples, HARQ feedback may be provided at a code block (CB) level, rather than a transport block (TB) level, which may generate a relatively large amount of HARQ ACK/NACK data relative to legacy LTE systems. In some examples, a UE may identify a number of HARQ feedback bits to be included in the UCI based at least in part on a number of configured component carriers, a number of HARQ processes per component carrier, or any combination thereof. Thus, the number of ACK/NACK bits for a particular uplink transmission may be a fixed payload size, that a UE may use to identify a UCI format.

Figure 8:
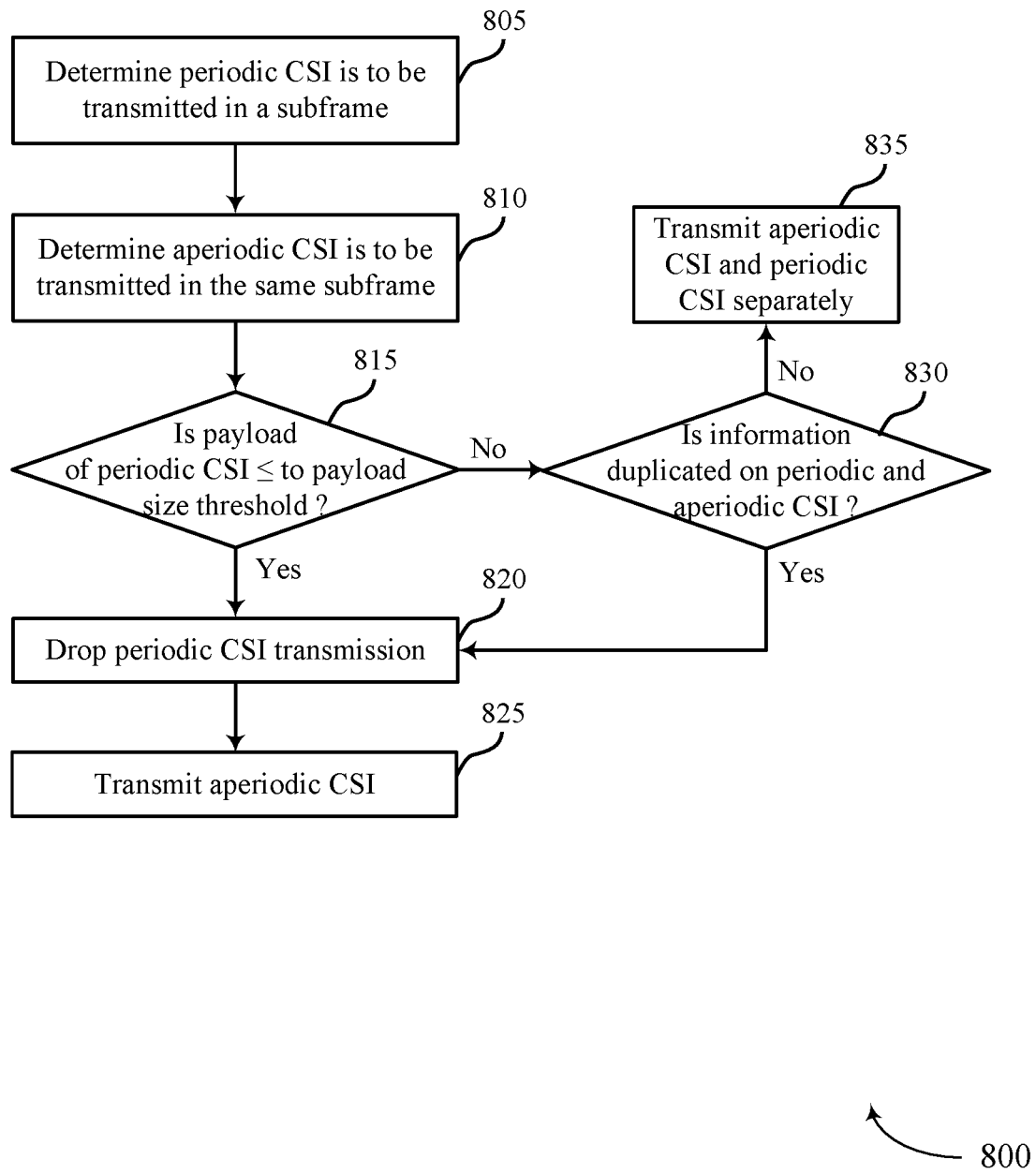
FIG. 8 illustrates an example of a method for channel state information (CSI) reporting for uplink control channel transmissions in a shared radio frequency spectrum band in accordance with aspects of the present disclosure.

FIG. 8 illustrates an example of a method 800 for channel state information (CSI) reporting for uplink control channel transmissions in a shared radio frequency spectrum band in accordance with aspects of the present disclosure. CSI may include, for example, information describing characteristics of the radio channel between one or more transmit antennas of the base station and one or more receive antennas of the UE. CSI transmissions may include periodic CSI, and aperiodic CSI. In some cases, method 800 may represent aspects of techniques performed by a UE or base station as described with reference to FIGS. 1-2. The operations of method 800 may be implemented by a device such as a UE or its components as described with reference to FIGS. 1 and 2. For example, the operations of method 800 may be performed by the UE UL transmission manager as described herein. In some examples, the UE may execute a set of codes to control the functional elements of the device to perform the functions described below. Additionally or alternatively, the UE may perform aspects the functions described below using special-purpose hardware.

In the example of FIG. 8, at block 805, a UE may determine that periodic CSI is to be transmitted in a subframe. In some examples, periodic CSI may be transmitted using PCell PUCCH resources. When using a shared radio frequency spectrum band, periodic CSI transmissions may be delayed in the event that a UE does not gain channel access at the time of a periodic CSI transmission. At block 810, the UE may determine that aperiodic CSI is to be transmitted in the same subframe. Aperiodic CSI may be transmitted, in some examples, using PUSCH resources of one or more RRC configured CCs, or on a CC indicated in an uplink grant containing the aperiodic CSI trigger. In some cases, aperiodic CSI may be triggered, for example, in downlink control information (DCI), a random access response grant, or by a CSI request transmitted in a UE-specific PDCCH search space.

Thus, a collision in aperiodic CSI and periodic CSI is present. In some existing deployments, such a collision may result in a UE dropping periodic CSI and reporting only aperiodic CSI. In some examples, CSI multiplexing may be based on such a collision and on a payload size associated with the periodic CSI transmission. At block 815, it is determined whether the payload of the periodic CSI is less than or equal to a payload size threshold. If the periodic payload size is less than or equal to the size threshold, the UE may, at block 820, drop the periodic CSI transmission. At block 825, the UE may transmit the aperiodic CSI using the configured PUSCH resources.

If it is determined at block 815 that the payload of the periodic CSI exceeds the payload size threshold, the UE may determine whether information is duplicated on the periodic CSI and aperiodic CSI, as indicated at block 830. Such a duplication may indicate that redundant information is included in the periodic CSI and aperiodic CSI. If it is determined that information is duplicated, the UE may perform operations associated above blocks 820 and 825 as discussed above to drop periodic CSI. In some other examples, the UE may transmit periodic CSI and drop aperiodic CSI. In still further examples, the UE may identify which CSI to drop based on payload size. If the UE determines at block 830 that the aperiodic CSI and periodic CSI information is not duplicated, the UE may transmit both the aperiodic CSI and the periodic CSI separately in the allocated PUSCH and PUCCH resources, respectively, as indicated at block 835.

Figure 9:
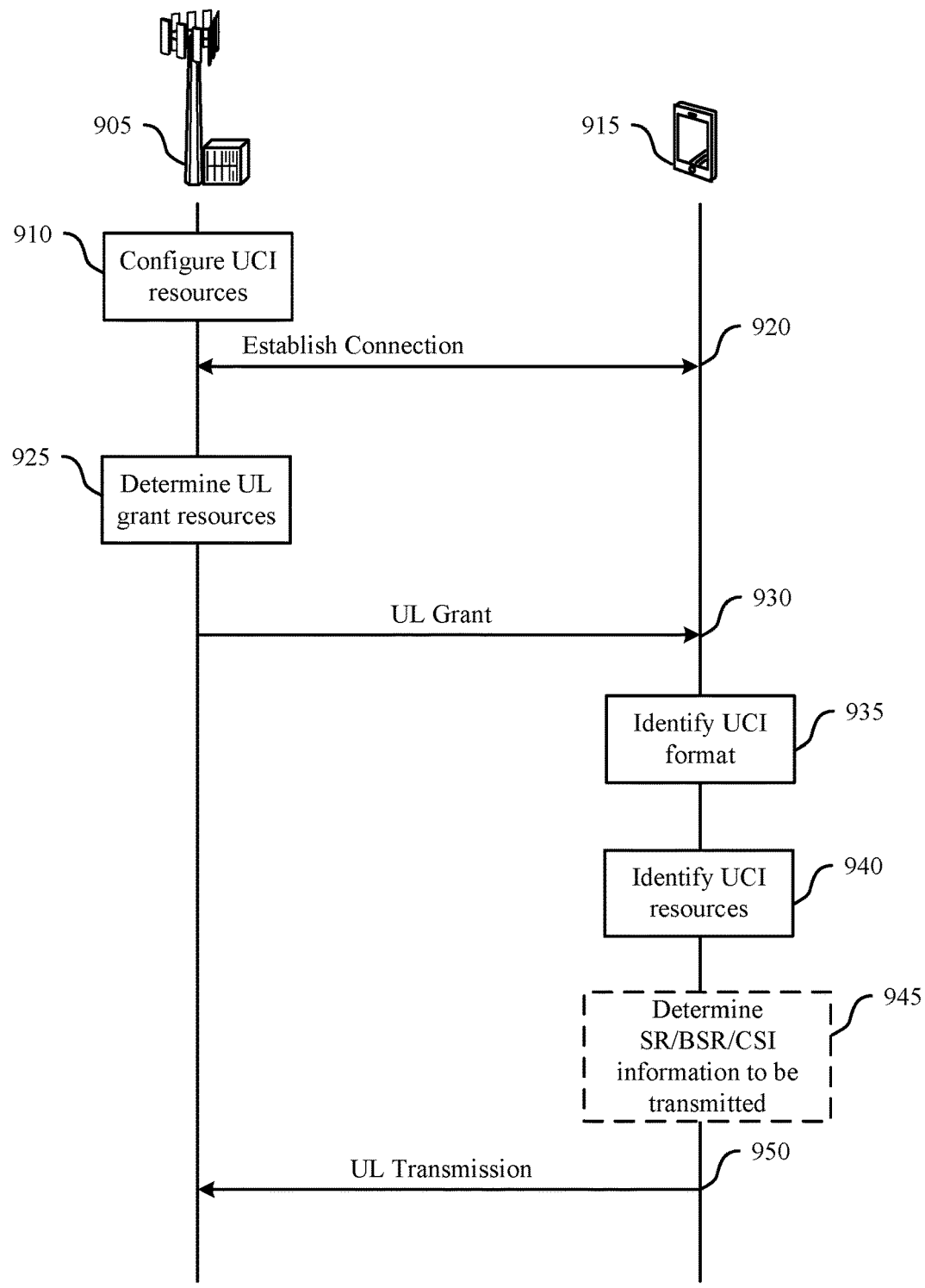
FIG. 9 illustrates an example of a process flow in a system that supports uplink control channel transmissions in a shared radio frequency spectrum band in accordance with aspects of the present disclosure.

FIG. 9 illustrates an example of a process flow 900 for uplink control channel transmissions in a shared radio frequency spectrum band in accordance with various aspects of the present disclosure. Process flow 900 may include base station 905 and UE 915, which may be examples of the corresponding devices described with reference to FIG. 1-2.

At block 910, the base station 905 may configure UCI resources. In some examples, the base station 905 may identify a plurality of different UCI formats for transmitting UCI in an uplink control channel transmission, and configure, for each of the plurality of different UCI formats, a different subset of uplink control channel resources from a set of uplink control channel resources. Each subset of uplink control channel resources may include a subset of uplink control channel frequency resources, a subset of uplink control channel time resources, or combinations thereof. In some examples, each subset of uplink control channel resources may include a set of frequency resource interlaces and a set of frequency resource interlace segments, where each frequency resource interlace segment of the set of frequency resource interlace segments may include a portion of resources of the frequency resource interlaces of the set of frequency resource interlaces. In other examples, each subset of uplink control channel resources may include a subset of uplink control channel resources of different subframes of a plurality of subframes, and the base station 905 may configure uplink control channel resources of different subframes for different UCI formats. In some examples, each subset of uplink control channel resources may include a subset of uplink control channel resources of different component carriers, and the base station may configure the subset of uplink control channel resources for the different component carriers for different UCI formats. In further examples, the base station 905 may configure a first set of uplink control channel resources of a first TTI (e.g., a first subframe) for a first UCI format and a second set of uplink control channel resources of a second TTI for a second UCI format. In some examples, the uplink control channel resources of the first and second TTIs may be the same resources within each TTI.

The base station 905 and the UE 915 may establish a connection 920. The base station 905 and UE 915 may establish connection 920 according to established connection establishment or connection reestablishment techniques, which may include establishing a connection over multiple CCs, which may use dedicated radio frequency spectrum band, shared radio frequency spectrum band, or combinations thereof. In some examples, the base station 905 may signal the configured subsets of uplink control channel resources to the UE 915 as part of the connection establishment 920 (e.g., via RRC configuration).

The base station 905, at block 925, may determine uplink grant resources. The base station 905 may determine the uplink grant resources based on various factors, including a BSR of the UE 915, a HARQ retransmission indication, or an SR received from the UE 915, to name but a few examples. In some examples, the base station 905 may determine the uplink grant resources based on a determined UCI type for the UE 915, and may grant uplink resources to the UE 915 in the event that PUCCH resources associated with a TTI of the uplink grant correspond to a UCI format that is to be used by the UE. The base station 905 may transmit UL grant 930, which may indicate allocated uplink resources to the UE 915. In some examples, the UL grant may also provide a dynamic indication to the UE of a UCI format to use for an uplink UCI transmission. In some examples, such a dynamic indication may be provided in common signaling such as PDCCH signaling rather than in dedicated signaling of the UL grant 930.

At block 935, the UE 915 may identify the UCI format. The UCI format may be identified based on, for example, a payload of the UCI, such as a payload of HARQ feedback to be transmitted, number of configured CCs, the existence of a SR, BSR, or CSI to be transmitted, or any combination thereof. In some examples, the base station 905 may signal a UCI format to use, and the UE 915 may determine UCI payload based on the indicated UCI format.

At block 940, the UE 915 may identify UCI resources. Such an identification may include, for example, identifying, based at least in part on the identified UCI format, a first subset of uplink control channel resources from a set of configured uplink control channel resources, the set of configured uplink control channel resources including a plurality of subsets of uplink control channel frequency resources, time resources, or combinations thereof. In some examples, different subsets of the set of configured uplink control channel resources correspond to different UCI formats. In some examples, the set of configured uplink control channel resources may include a first set of frequency resource interlaces and a first set of frequency resource interlace segments, and each frequency resource interlace segment of the first set of frequency resource interlace segments may include a portion of resources of the frequency resource interlaces of the first set of frequency resource interlaces. In such examples, the UE 915 may identify the first subset of uplink control channel resources as a first subset of the first set of frequency resource interlace segments based at least in part on the identified UCI format.

In some examples, the set of configured uplink control channel resources may include a subset of uplink control channel resources of a plurality of subframes, the subset of uplink control channel resources for different subframes being configured for different UCI formats, and the first subset of uplink control channel resources may be identified by the UE 915 according to a subframe that corresponds to the identified UCI format. In further examples, the set of configured uplink control channel resources may include a subset of uplink control channel resources of a plurality of uplink component carriers, the subset of uplink control channel resources for different component carriers being configured for different UCI formats, and the UE 915 may identify the first subset of uplink control channel resources as resources of a first component carrier based at least in part on the identified UCI format. In further examples, the UCI resources may be identified based in signaling in the uplink grant 930, which may indicate a UCI format or may indicate UCI resources.

At optional block 945, the UE 915 may determine SR/BSR/CSI information to be transmitted. In some examples, all or portions of SR/BSR/CSI information may be transmitted or dropped based on one or more dropping rules such as discussed above. For example, UE 915 may determine to drop a transmission of a SR using a primary component carrier based at least in part on identifying that a buffer status report (BSR) is to be included in the UCI and transmitted using the first subset of uplink control channel resources of a secondary component carrier in the first subframe. In other examples, the UE 915 may identify a periodic CSI is to be included in the UCI and transmitted in a first subframe and that an aperiodic CSI is to be transmitted during the first subframe using different resources than the first subset of uplink control channel resources, and the UE may drop the periodic CSI from the UCI based at least in part on a size of the payload of the periodic CSI. Such dropping of certain information may be configured by the base station 905, such as through RRC signaling, for example. The UE 915 transmits uplink transmission 950 to the base station 905, which may include UCI according to the identified UCI format that is transmitted on resources corresponding to the identified UCI format. In some examples, a base station 905 may prohibit the UE 915 from using UCI formats of the plurality of different UCI formats other than a signaled first UCI format.

Figure 10:
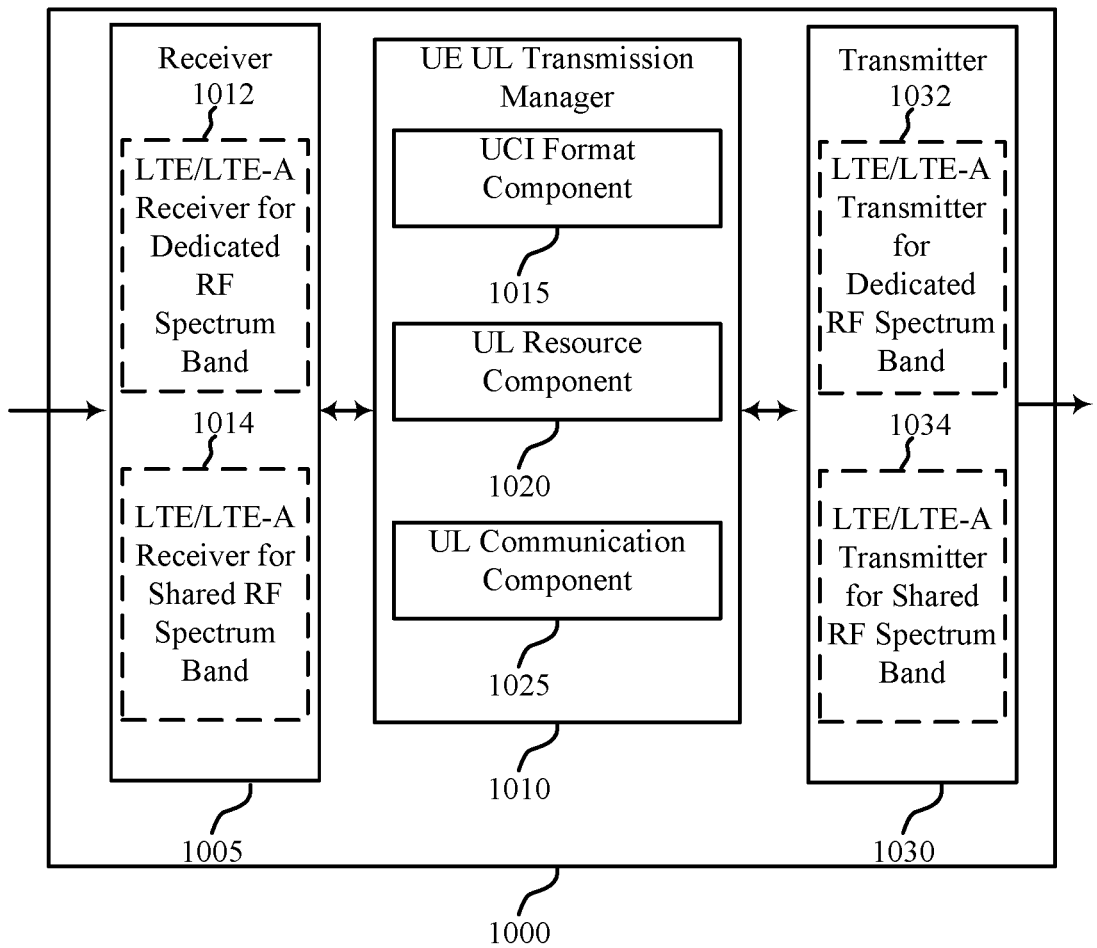
FIGS. 10 through 11 show block diagrams of a wireless device that supports uplink control channel transmissions in a shared radio frequency spectrum band in accordance with aspects of the present disclosure.

FIG. 10 shows a block diagram of a wireless device 1000 that supports uplink control channel transmissions in a shared radio frequency spectrum band in accordance with various aspects of the present disclosure. Wireless device 1000 may be an example of aspects of a UE described with reference to FIGS. 1 and 2. Wireless device 1000 may include receiver 1005, transmitter 1030 and UE UL transmission manager 1010. Wireless device 1000 may also include a processor. Each of these components may be in communication with each other.

In some examples, the receiver 1005 may include at least one radio frequency (RF) receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIGS. 1 through 9. The receiver 1005 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1012), and an LTE/LTE-A receiver for communicating over the shared radio frequency spectrum band (e.g., LTE/LTE-A receiver for shared RF spectrum band 1014). The receiver 1005, including the LTE/LTE-A receiver for dedicated RF spectrum band 1012 or the LTE/LTE-A receiver for shared RF spectrum band 1014, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1030 may include at least one RF transmitter, such as at least one RF transmitter operable to transmit over the dedicated radio frequency spectrum band or the shared radio frequency spectrum band. The transmitter 1030 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1032), and an LTE/LTE-A transmitter for communicating over the shared RF spectrum band (e.g., LTE/LTE-A transmitter for shared RF spectrum band 1034). The transmitter 1030, including the LTE/LTE-A transmitter for dedicated RF spectrum band 1032 or the LTE/LTE-A transmitter for shared RF spectrum band 1034, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

The UE UL transmission manager 1010 may identify a UCI format for transmitting UCI using an uplink control channel transmission, and identify, based on the identified UCI format, a first subset of uplink control channel resources from a set of configured uplink control channel resources. The set of configured uplink control channel resources may include a set of subsets of uplink control channel frequency resources, a set of subsets of uplink control channel time resources, or combinations thereof, and different subsets of the set of configured uplink control channel resources may correspond to different UCI formats. The UE UL transmission manager 1010 may communicate the UCI using the first subset of uplink control channel resources.

The UE UL transmission manager 1010 may include UCI format component 1015, UL resource component 1020 and UL communication component 1025. The UCI format component 1015 may identify a UCI format for transmitting UCI using an uplink control channel transmission based on payload of the UCI. In some cases, the UCI format component 1015 may receive signaling indicating the UCI format for transmitting the UCI, and the UCI may be transmitted using the indicated UCI format. In some cases, the signaling is received in PDCCH signaling or in an uplink grant.

The UL resource component 1020 may identify, based on the identified UCI format, a first subset of uplink control channel resources from a set of configured uplink control channel resources, the set of configured uplink control channel resources may include a set of subsets of uplink control channel frequency resources, a set of subsets of uplink control channel time resources, or combinations thereof, where different subsets of the set of configured uplink control channel resources correspond to different UCI formats.

In some cases, the set of configured uplink control channel resources includes a subset of uplink control channel resources of a set of subframes, the subset of uplink control channel resources for different subframes being configured for different UCI formats. The identifying of the first subset of uplink control channel resources in such cases may include identifying a first subset of the first set of uplink control channel of a first subframe based on the identified UCI format. In some cases, the set of configured uplink control channel resources includes a subset of uplink control channel resources of a set of uplink component carriers, the subset of uplink control channel resources for different component carriers being configured for different UCI formats, and where identifying the first subset of uplink control channel resources includes identifying a first subset of the first set of uplink control channel of a first component carrier based on the identified UCI format.

In some cases, the first set of resources is in a shared radio frequency spectrum band. In some cases, the set of configured uplink control channel resources includes a first set of frequency resource interlaces and a first set of frequency resource interlace segments, each frequency resource interlace segment of the first set of frequency resource interlace segments includes a portion of resources of the frequency resource interlaces of the first set of frequency resource interlaces, and where identifying the first subset of uplink control channel resources includes identifying a first subset of the first set of frequency resource interlace segments based on the identified UCI format. The UL communication component 1025 may communicate the UCI using the first subset of uplink control channel resources.

Figure 11:
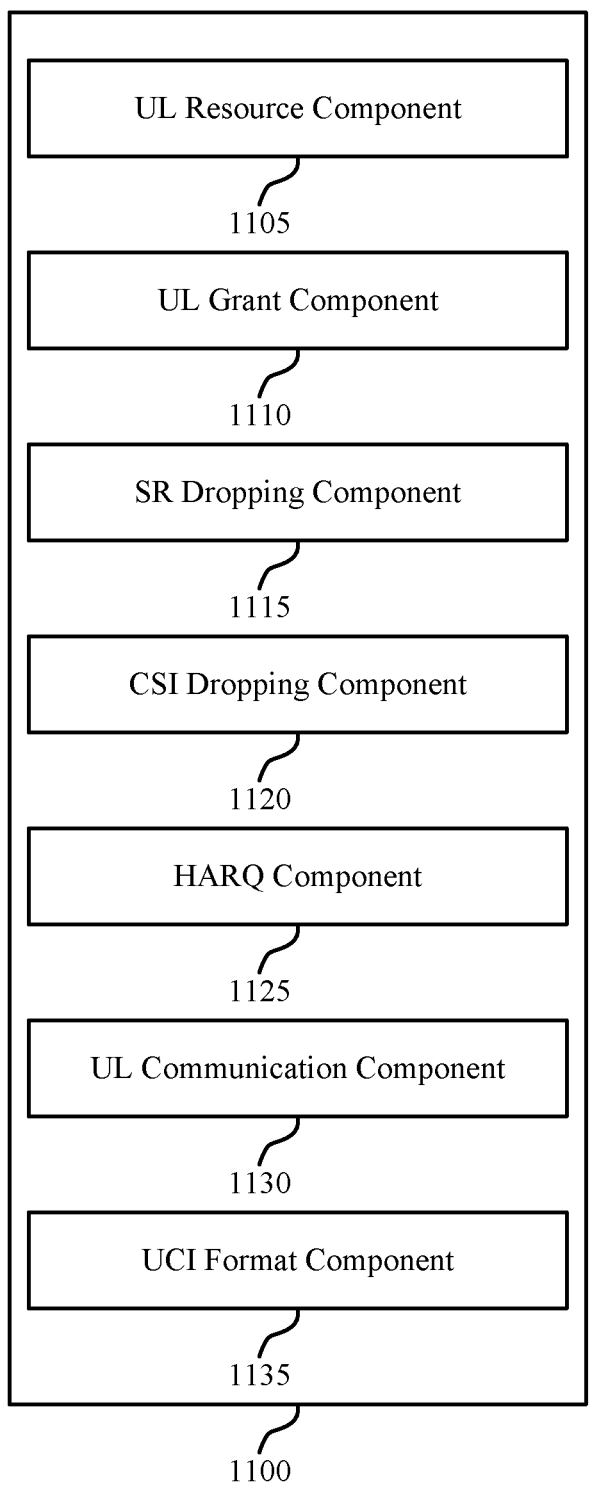

FIG. 11 shows a block diagram of a UE UL transmission manager 1100 which may be an example of the corresponding component of wireless device 1000. That is, UE UL transmission manager 1100 may be an example of aspects of UE UL transmission manager 1010 described with reference to FIG. 10. The UE UL transmission manager 1100 may also be an example of aspects of the UE UL transmission manager 1240 described with reference to FIG. 12.

The UE UL transmission manager 1100 may include UL resource component 1105, UL grant component 1110, SR dropping component 1115, CSI dropping component 1120, HARQ component 1125, UL communication component 1130 and UCI format component 1135. Each of these modules may communicate, directly or indirectly, with one another (e.g., via one or more buses).

The UL resource component 1105 may identify, based on the identified UCI format, a first subset of uplink control channel resources from a set of configured uplink control channel resources, the set of configured uplink control channel resources includes a set of subsets of uplink control channel frequency resources, a set of subsets of uplink control channel time resources, or combinations thereof, and where different subsets of the set of configured uplink control channel resources correspond to different UCI formats.

The UL grant component 1110 may receive a first uplink grant for the first uplink control channel transmission, the first uplink grant including an allocation of the first subset of uplink control channel resources, and where communicating the UCI includes transmitting the UCI using the first subset of uplink control channel resources allocated in the first uplink grant.

The SR dropping component 1115 may identify a SR to be transmitted using a primary component carrier in a first subframe, and drop the transmission of the SR using the primary component carrier based on identifying that a BSR is to be included in the UCI and transmitted using the first subset of uplink control channel resources of a secondary component carrier in the first subframe.

The CSI dropping component 1120 may identify periodic CSI is to be included in the UCI and transmitted in a first subframe, identify that aperiodic CSI is to be transmitted during the first subframe using different resources than the first subset of uplink control channel resources, and drop the periodic CSI from the UCI based on a size of the payload of the periodic CSI.

The HARQ component 1125 may identify a number of HARQ feedback bits to be included in the UCI based on a number of configured component carriers, a number of HARQ processes per component carrier, or any combination thereof. The UL communication component 1130 may communicate the UCI using the first subset of uplink control channel resources.

The UCI format component 1135 may receive signaling indicating the UCI format for transmitting the UCI, wherein communicating the UCI includes transmitting the UCI using the indicated UCI format, and identify a UCI format for transmitting UCI using an uplink control channel transmission. In some cases, the signaling is received in PDCCH signaling or in an uplink grant.

Figure 12:
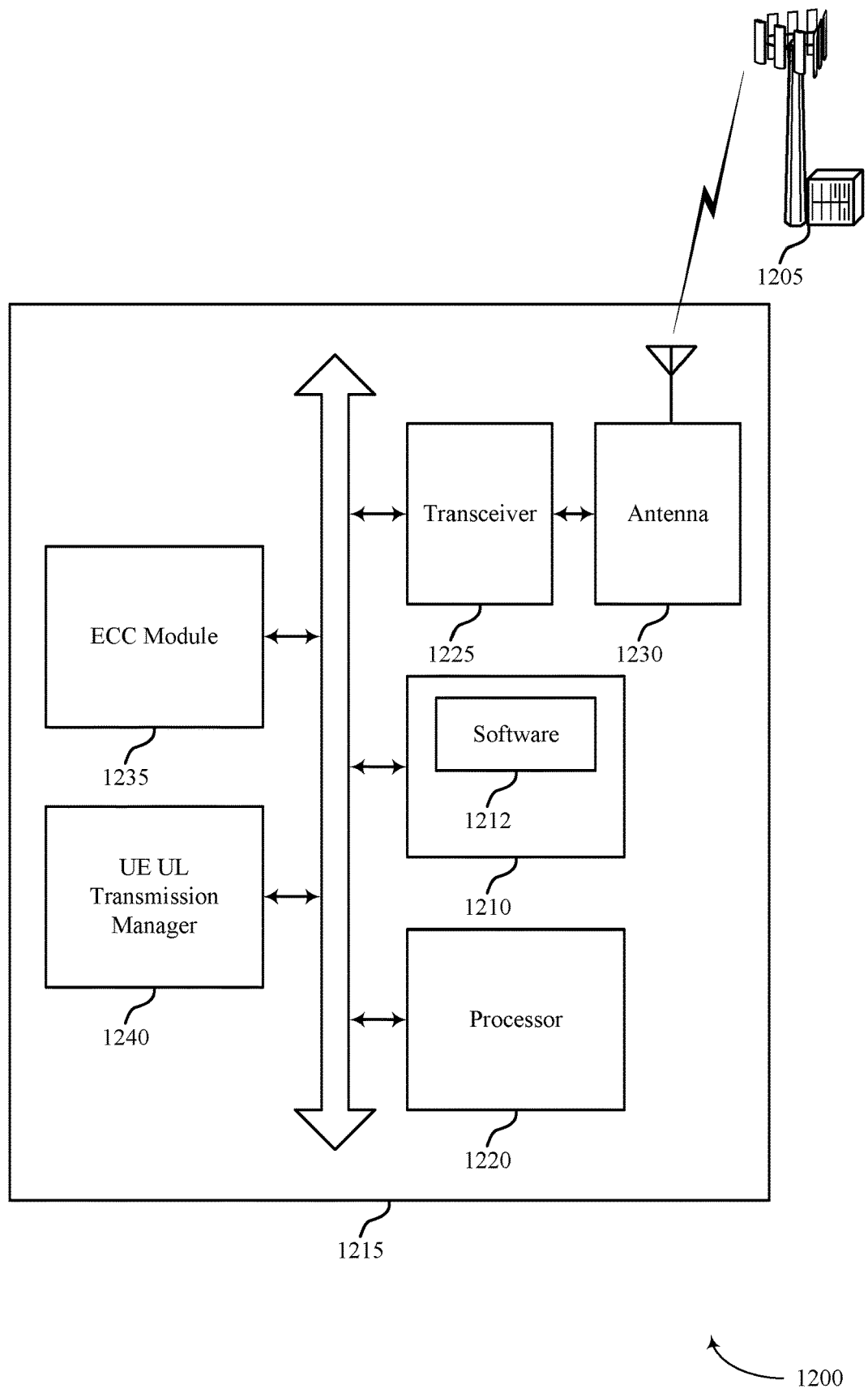
FIG. 12 illustrates a block diagram of a system including a device that supports uplink control channel transmissions in a shared radio frequency spectrum band in accordance with aspects of the present disclosure.

FIG. 12 illustrates a block diagram of a system 1200 including a device that supports uplink control channel transmissions in a shared radio frequency spectrum band in accordance with various aspects of the present disclosure. For example, system 1200 may include UE 1215, which may be an example of a wireless device 1000, or a UE as described with reference to FIGS. 1 through 11. UE 1215 may be in communication with base station 1205, which may be an example of a base station as described with reference to FIGS. 1 through 11.

UE 1215 may also include UE UL transmission manager 1240, memory 1210, processor 1220, transceiver 1225, antenna 1230 and ECC module 1235. Each of these modules may communicate, directly or indirectly, with one another (e.g., via one or more buses). The UE UL transmission manager 1240 may be an example of a UE UL transmission manager as described with reference to FIGS. 10 through 11.

The memory 1210 may include random access memory (RAM) and read only memory (ROM). The memory 1210 may store computer-readable, computer-executable software including instructions that, when executed, cause the processor to perform various functions described herein (e.g., uplink control channel transmissions in a shared radio frequency spectrum band, etc.). In some cases, the software 1212 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.)

The transceiver 1225 may communicate bi-directionally, via one or more antennas, wired, or wireless links, with one or more networks, as described above. For example, the transceiver 1225 may communicate bi-directionally with a base station or a UE. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna, which may be capable of concurrently transmitting or receiving multiple wireless transmissions.

ECC module 1235 may enable operations using enhanced component carriers (ECCs) such as communication using shared or unlicensed spectrum, using reduced TTIs or subframe durations, or using a large number of component carriers.

Figure 13:
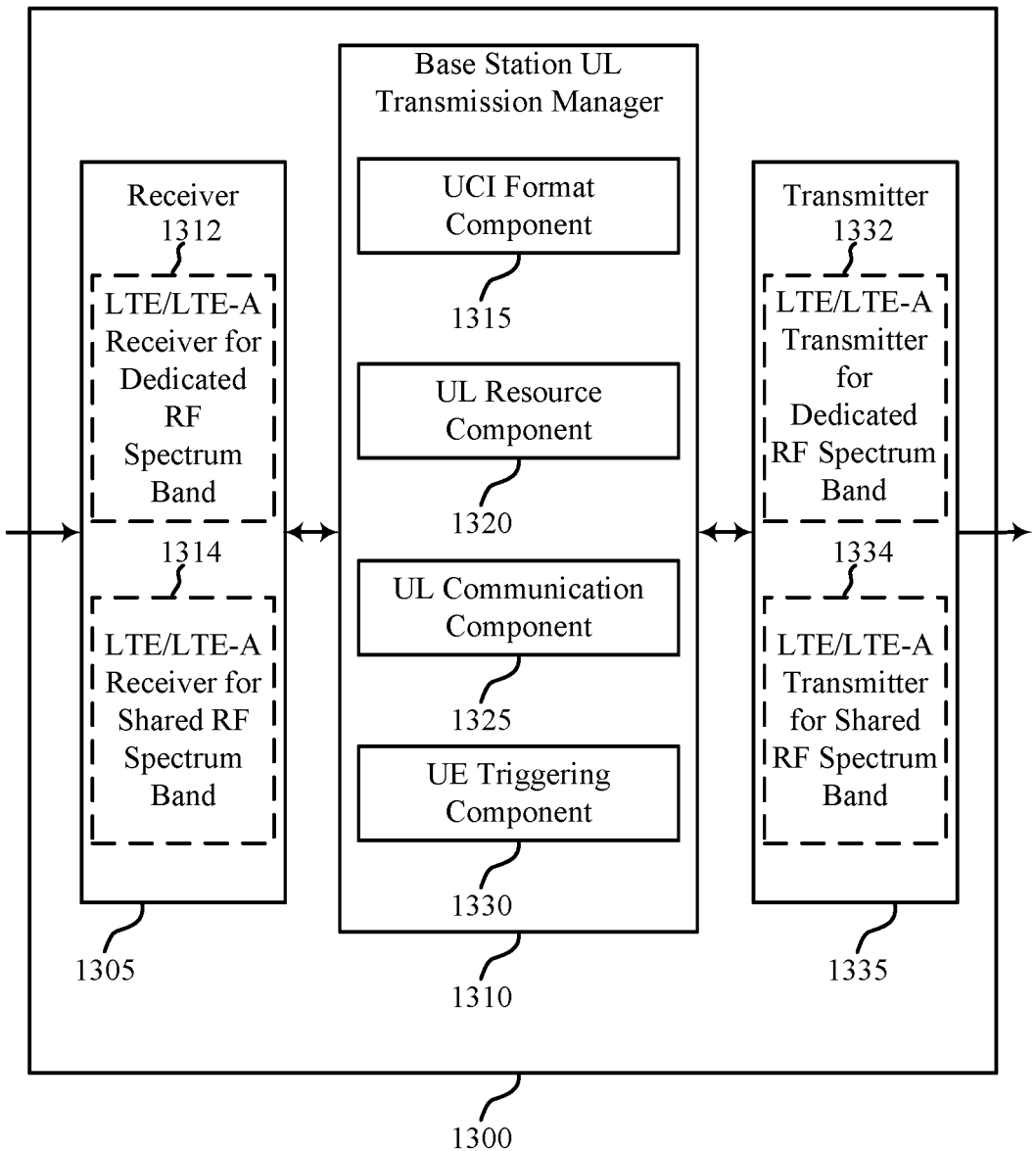
FIGS. 13 through 14 show block diagrams of a wireless device that supports uplink control channel transmissions in a shared radio frequency spectrum band in accordance with aspects of the present disclosure.

FIG. 13 shows a block diagram of a wireless device 1300 that supports uplink control channel transmissions in a shared radio frequency spectrum band in accordance with various aspects of the present disclosure. Wireless device 1300 may be an example of aspects of a base station 105 or 205 described with reference to FIGS. 1 and 2. Wireless device 1300 may include receiver 1305, transmitter 1335 and base station UL transmission manager 1310. Wireless device 1300 may also include a processor. Each of these components may be in communication with each other.

In some examples, the receiver 1305 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIGS. 1 through 9. The receiver 1305 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1312), and an LTE/LTE-A receiver for communicating over the shared radio frequency spectrum band (e.g., LTE/LTE-A receiver for shared RF spectrum band 1314). The receiver 1305, including the LTE/LTE-A receiver for dedicated RF spectrum band 1312 or the LTE/LTE-A receiver for shared RF spectrum band 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1335 may include at least one RF transmitter, such as at least one RF transmitter operable to transmit over the dedicated radio frequency spectrum band or the shared radio frequency spectrum band. The transmitter 1335 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1332), and an LTE/LTE-A transmitter for communicating over the shared RF spectrum band (e.g., LTE/LTE-A transmitter for shared RF spectrum band 1334). The transmitter 1335, including the LTE/LTE-A transmitter for dedicated RF spectrum band 1332 or the LTE/LTE-A transmitter for shared RF spectrum band 1334, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

The base station UL transmission manager 1310 may identify a set of different UCI formats for transmitting UCI in an uplink control channel transmission, configure, for each of the set of different UCI formats, a different subset of uplink control channel resources from a set of uplink control channel resources, where each subset of uplink control channel resources includes a subset of uplink control channel frequency resources, a subset of uplink control channel time resources, or combinations thereof, and communicate the configured subsets of uplink control channel resources to one or more receivers.

The base station UL transmission manager 1310 may also identify a set of different UCI formats for transmitting UCI in an uplink control channel transmission, configure a first set of uplink control channel resources of a first TTI for a first UCI format and a second set of uplink control channel resources of a second TTI for a second UCI format, identify at least a first UE that is to transmit using the first UCI format and a second UE that is to transmit using the second UCI format, and trigger the first UE to transmit during the first TTI and the second UE to transmit during the second TTI.

The base station UL transmission manager 1310 may also identify a set of different UCI formats for transmitting UCI in an uplink control channel transmission, configure at least a first UE to use a first UCI format for transmitting UCI, and communicate the configuration to the first UE to use the first UCI format. The base station UL transmission manager 1310 may also be an example of aspects of the base station UL transmission manager 1545 described with reference to FIG. 15.

The base station UL transmission manager 1310 may include UCI format component 1315, UL resource component 1320, UL communication component 1325 and UE triggering component 1330. The base station UL transmission manager 1310 may be an example of aspects of the base station UL transmission manager 1545 described with reference to FIG. 15.

The UCI format component 1315 may identify a set of different UCI formats for transmitting UCI in an uplink control channel transmission, and configure at least a first UE to use a first UCI format for transmitting UCI. In some cases, configuring at least the first UE to use the first UCI format for transmitting UCI further includes prohibiting the first UE from using UCI formats of the set of different UCI formats other than the first UCI format.

The UL resource component 1320 may configure, for each of the set of different UCI formats, a different subset of uplink control channel resources from a set of uplink control channel resources, where each subset of uplink control channel resources includes a subset of uplink control channel frequency resources, a subset of uplink control channel time resources, or combinations thereof, and configure a first set of uplink control channel resources of a first TTI for a first UCI format and a second set of uplink control channel resources of a second TTI for a second UCI format.

In some cases, each subset of uplink control channel resources includes a set of frequency resource interlaces and a set of frequency resource interlace segments, each frequency resource interlace segment of the set of frequency resource interlace segments includes a portion of resources of the frequency resource interlaces of the set of frequency resource interlaces. In some cases, each subset of uplink control channel resources includes a subset of uplink control channel resources of different subframes of a set of subframes, and where configuring the different subsets of uplink control channel resources includes configuring the subset of uplink control channel resources for the different subframes for different UCI formats.

In some cases, each subset of uplink control channel resources includes a subset of uplink control channel resources of different component carriers, and where configuring the different subsets of uplink control channel resources includes configuring the subset of uplink control channel resources for the different component carriers for different UCI formats. In some cases, the set of uplink control channel resources is in a shared radio frequency spectrum band.

The UL communication component 1325 may communicate the configured subsets of uplink control channel resources to one or more receivers, and communicate the configuration to the first UE to use the first UCI format. The UE triggering component 1330 may identify at least a first UE that is to transmit using the first UCI format and a second UE that is to transmit using the second UCI format, and trigger the first UE to transmit during the first TTI and the second UE to transmit during the second TTI.

In some cases, the first subset of uplink control channel resources and the second subset of control channel resources correspond to a same set of frequency resource interlaces and set of frequency resource interlace segments within the first TTI and the second TTI, where each frequency resource interlace segment of the set of frequency resource interlace segments includes a portion of resources of the frequency resource interlaces of the set of frequency resource interlaces. In some cases, triggering the first UE to transmit during the first TTI and the second UE to transmit during the second TTI includes transmitting a first uplink grant to the first UE for uplink transmission in the first TTI.

Figure 14:
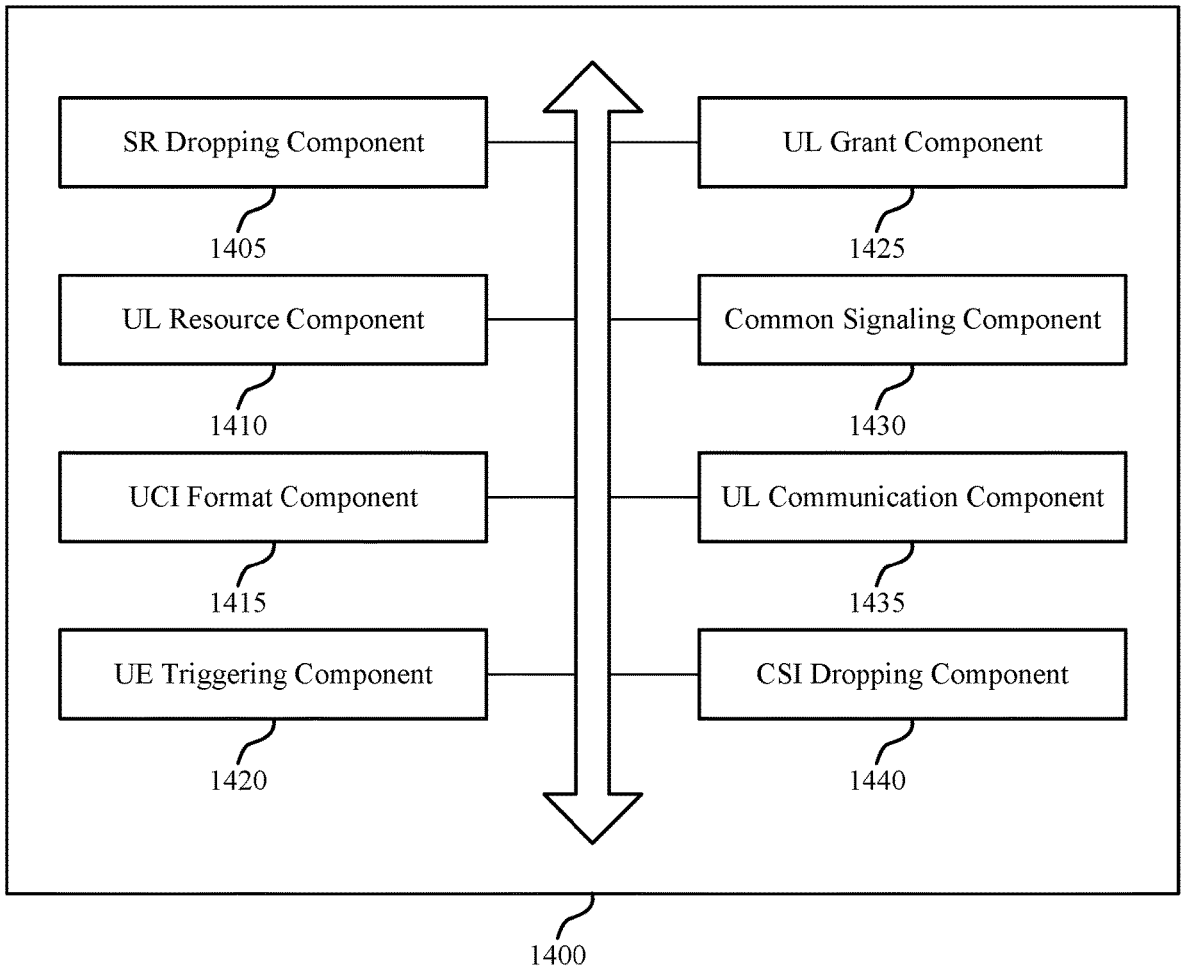

FIG. 14 shows a block diagram of a base station UL transmission manager 1400 which may be an example of the corresponding component of wireless device 1300. That is, base station UL transmission manager 1400 may be an example of aspects of base station UL transmission manager 1310 described with reference to FIG. 13. The base station UL transmission manager 1400 may also be an example of aspects of the base station UL transmission manager 1545 described with reference to FIG. 15.

The base station UL transmission manager 1400 may include SR dropping component 1405, UL resource component 1410, UCI format component 1415, UE triggering component 1420, UL grant component 1425, common signaling component 1430, UL communication component 1435 and CSI dropping component 1440. Each of these modules may communicate, directly or indirectly, with one another (e.g., via one or more buses).

The SR dropping component 1405 may configure the one or more receivers to drop a SR transmission using a primary component carrier in a first subframe based on an identification that a BSR is to be included in the UCI and transmitted in the first subframe.

The UL resource component 1410 may configure, for each of the set of different UCI formats, a different subset of uplink control channel resources from a set of uplink control channel resources, where each subset of uplink control channel resources includes a subset of uplink control channel frequency resources, a subset of uplink control channel time resources, or combinations thereof, and configure a first set of uplink control channel resources of a first TTI for a first UCI format and a second set of uplink control channel resources of a second TTI for a second UCI format.

The UCI format component 1415 may identify a set of different UCI formats for transmitting UCI in an uplink control channel transmission, and configure at least a first UE to use a first UCI format for transmitting UCI. The UE triggering component 1420 may identify at least a first UE that is to transmit using the first UCI format and a second UE that is to transmit using the second UCI format, and trigger the first UE to transmit during the first TTI and the second UE to transmit during the second TTI.

The UL grant component 1425 may transmit a second uplink grant to the second UE for uplink transmission in the second TTI. In some cases, communicating the configuration to the first UE includes transmitting an uplink grant to the first UE that indicates that UCI is to be transmitted using the first UCI format.

The common signaling component 1430 may communicate the common signaling such as PDCCH signaling transmitted to a set of UEs. In some cases, communicating the configuration to the first UE includes transmitting common signaling to the first UE and one or more other UEs that UCI is to be transmitted using the first UCI format. The UL communication component 1435 may communicate the configured subsets of uplink control channel resources to one or more receivers, and communicate the configuration to the first UE to use the first UCI format. The CSI dropping component 1440 may configure the one or more receivers to drop periodic CSI from the UCI during a first subframe based on a payload size of the periodic CSI and an identification that aperiodic CSI is to be transmitted during the first subframe using different resources than the configured subset of uplink control channel resources.

Figure 15:
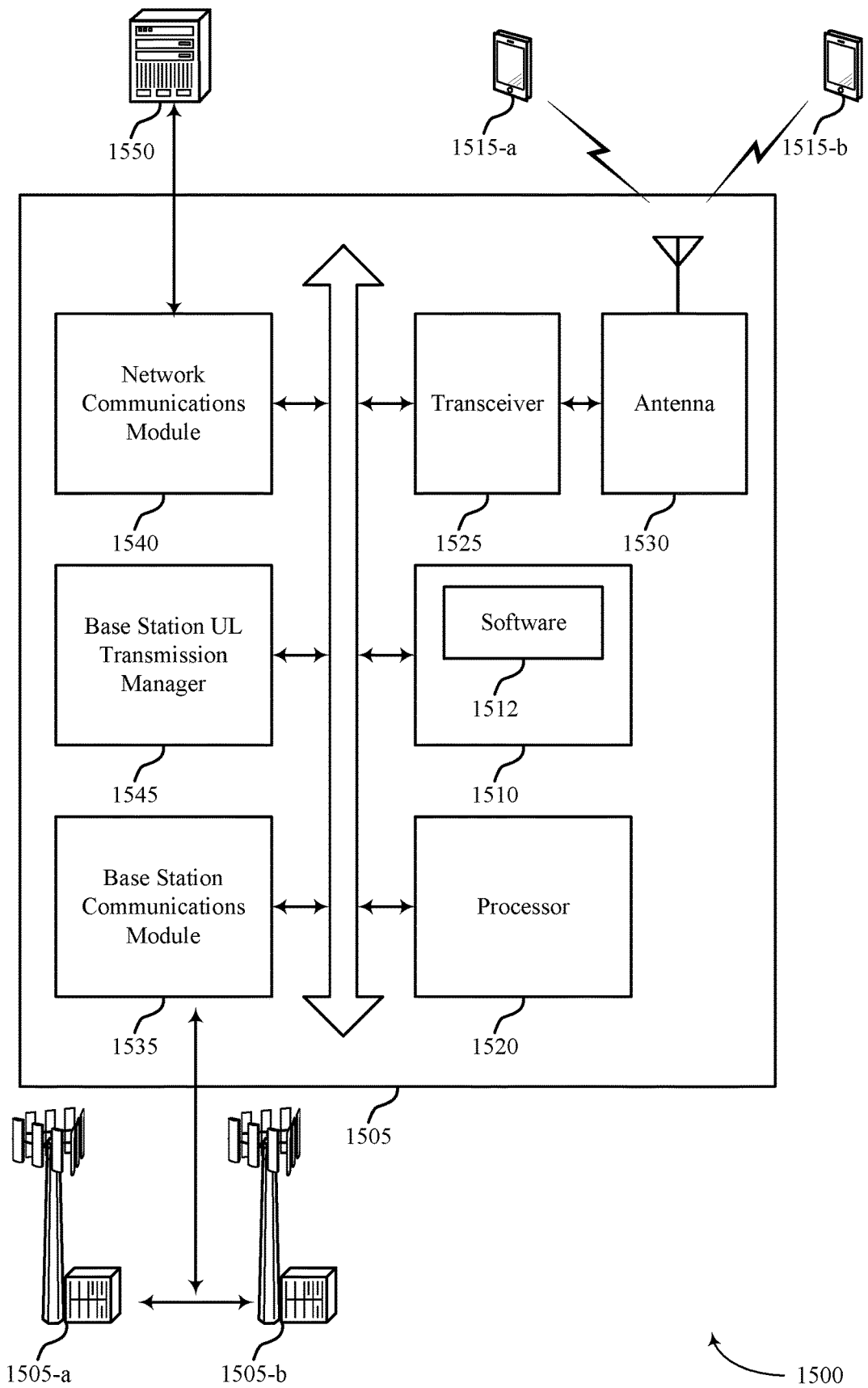
FIG. 15 illustrates a block diagram of a system including a device that supports uplink control channel transmissions in a shared radio frequency spectrum band in accordance with aspects of the present disclosure.

FIG. 15 illustrates a block diagram of a wireless communication system 1500 including a device configured that supports uplink control channel transmissions in a shared radio frequency spectrum band in accordance with various aspects of the present disclosure. For example, wireless communication system 1500 may include base station 1505, which may be an example of a wireless device 1300, or a base station 105 or 205 as described with reference to FIGS. 1, 2 and 13 through 14. Base station 1505 may also include components for bi-directional voice and data communications including components for transmitting communications and components for receiving communications. For example, base station 1505 may communicate bi-directionally with one or more UEs 1515.

Base station 1505 may also include base station UL transmission manager 1545, memory 1510, processor 1520, transceiver 1525, antenna 1530, base station communications module 1535 and network communications module 1540. Each of these modules may communicate, directly or indirectly, with one another (e.g., via one or more buses). The base station UL transmission manager 1545 may be an example of a base station UL transmission manager as described with reference to FIGS. 13 through 14.

The memory 1510 may include RAM and ROM. The memory 1510 may store computer-readable, computer-executable software 1512 including instructions that, when executed, cause the processor to perform various functions described herein (e.g., uplink control channel transmissions in a shared radio frequency spectrum band, etc.). In some cases, the software 1512 may not be directly executable by the processor but may cause a computer (e.g., when compiled and executed) to perform functions described herein. The processor 1520 may include an intelligent hardware device, (e.g., a CPU, a microcontroller, an ASIC, etc.).

The transceiver 1525 may communicate bi-directionally, via one or more antennas, wired, or wireless links, with one or more networks, as described above. For example, the transceiver 1525 may communicate bi-directionally with a base station 1505 or a UE 1515. The transceiver 1525 may also include a modem to modulate the packets and provide the modulated packets to the antennas for transmission, and to demodulate packets received from the antennas. In some cases, the wireless device may include a single antenna 1530. However, in some cases the device may have more than one antenna, which may be capable of concurrently transmitting or receiving multiple wireless transmissions.

The base station communications module 1535 may manage communications with other base station 1505-a and 1505-b, and may include a controller or scheduler for controlling communications with UEs 1515 in cooperation with other base stations 1505-a and 1505-b. For example, the base station communications module 1535 may coordinate scheduling for transmissions to UEs 1515 for various interference mitigation techniques such as beamforming or joint transmission. In some examples, base station communications module 1535 may provide an X2 interface within an LTE/LTE-A wireless communication network technology to provide communication between base stations 1505.

The network communications module 1540 may manage communications with the core network 1550 (e.g., via one or more wired backhaul links). For example, the network communications module 1540 may manage the transfer of data communications for client devices, such as one or more UEs 1515.

Figure 16:
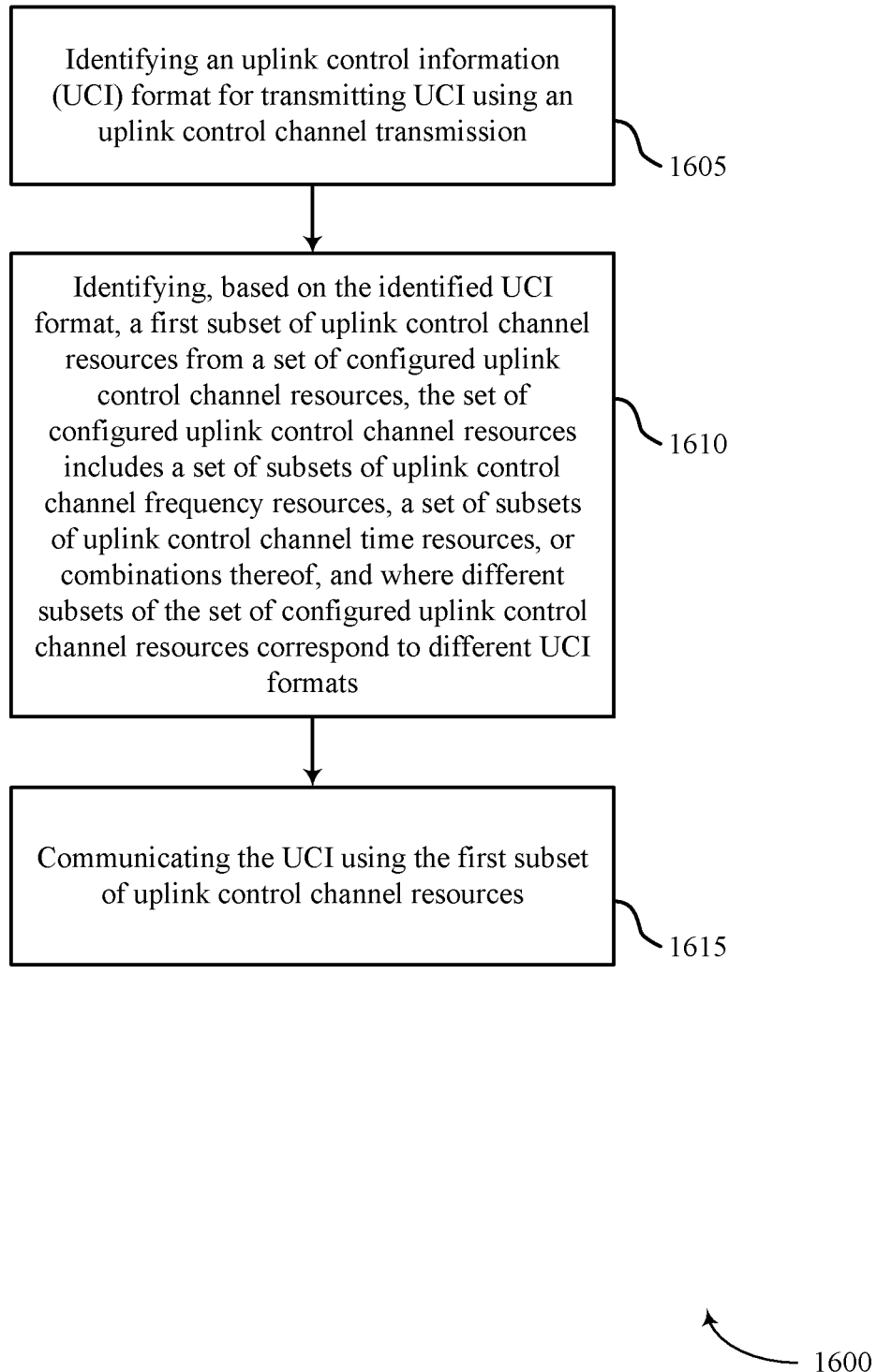
FIGS. 16 through 19 illustrate methods for uplink control channel transmissions in a shared radio frequency spectrum band in accordance with aspects of the present disclosure.

FIG. 16 shows a flowchart illustrating a method 1600 for uplink control channel transmissions in a shared radio frequency spectrum band in accordance with various aspects of the present disclosure. The operations of method 1600 may be implemented by a device such as a UE or its components as described with reference to FIGS. 1 and 2. For example, the operations of method 1600 may be performed by the UE UL transmission manager as described herein. In some examples, the UE may execute a set of codes to control the functional elements of the device to perform the functions described below. Additionally or alternatively, the UE may perform aspects the functions described below using special-purpose hardware.

At block 1605, the method 1600 may include identifying a UCI format for transmitting UCI using an uplink control channel transmission as described above with reference to FIGS. 2 through 9. In certain examples, the operations of block 1605 may be performed by the UCI format component as described with reference to FIGS. 10 and 11.

At block 1610, the method 1600 may include identifying, based on the identified UCI format, a first subset of uplink control channel resources from a set of configured uplink control channel resources, the set of configured uplink control channel resources includes a set of subsets of uplink control channel frequency resources, a set of subsets of uplink control channel time resources, or combinations thereof, and where different subsets of the set of configured uplink control channel resources correspond to different UCI formats as described above with reference to FIGS. 2 through 9. In certain examples, the operations of block 1610 may be performed by the UL resource component as described with reference to FIGS. 10 and 11.

At block 1615, the method 1600 may include communicating the UCI using the first subset of uplink control channel resources as described above with reference to FIGS. 2 through 9. In certain examples, the operations of block 1615 may be performed by the UL communication component as described with reference to FIGS. 10 and 11.

Figure 17:
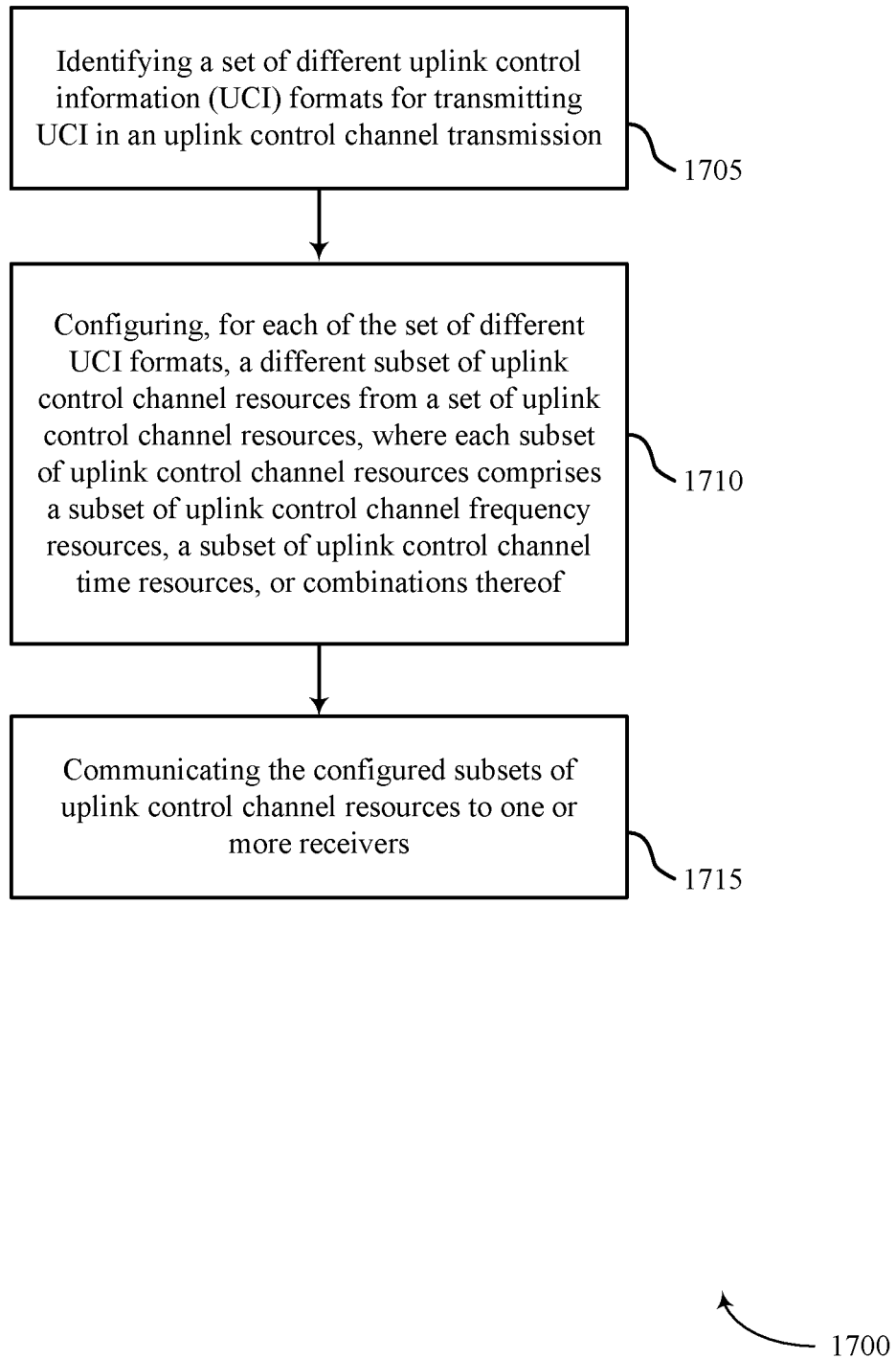

FIG. 17 shows a flowchart illustrating a method 1700 for uplink control channel transmissions in a shared radio frequency spectrum band in accordance with various aspects of the present disclosure. The operations of method 1700 may be implemented by a device such as a base station or its components as described with reference to FIGS. 1 and 2. For example, the operations of method 1700 may be performed by the base station UL transmission manager as described herein. In some examples, the base station may execute a set of codes to control the functional elements of the device to perform the functions described below. Additionally or alternatively, the base station may perform aspects the functions described below using special-purpose hardware.

At block 1705, the method 1700 may include identifying a set of different UCI formats for transmitting UCI in an uplink control channel transmission as described above with reference to FIGS. 2 through 9. In certain examples, the operations of block 1705 may be performed by the UCI format component as described with reference to FIGS. 13 and 14.

At block 1710, the method 1700 may include configuring, for each of the set of different UCI formats, a different subset of uplink control channel resources from a set of uplink control channel resources, where each subset of uplink control channel resources includes a subset of uplink control channel frequency resources, a subset of uplink control channel time resources, or combinations thereof as described above with reference to FIGS. 2 through 9. In certain examples, the operations of block 1710 may be performed by the UL resource component as described with reference to FIGS. 13 and 14.

At block 1715, the method 1700 may include communicating the configured subsets of uplink control channel resources to one or more receivers as described above with reference to FIGS. 2 through 9. In certain examples, the operations of block 1715 may be performed by the UL communication component as described with reference to FIGS. 13 and 14.

Figure 18:
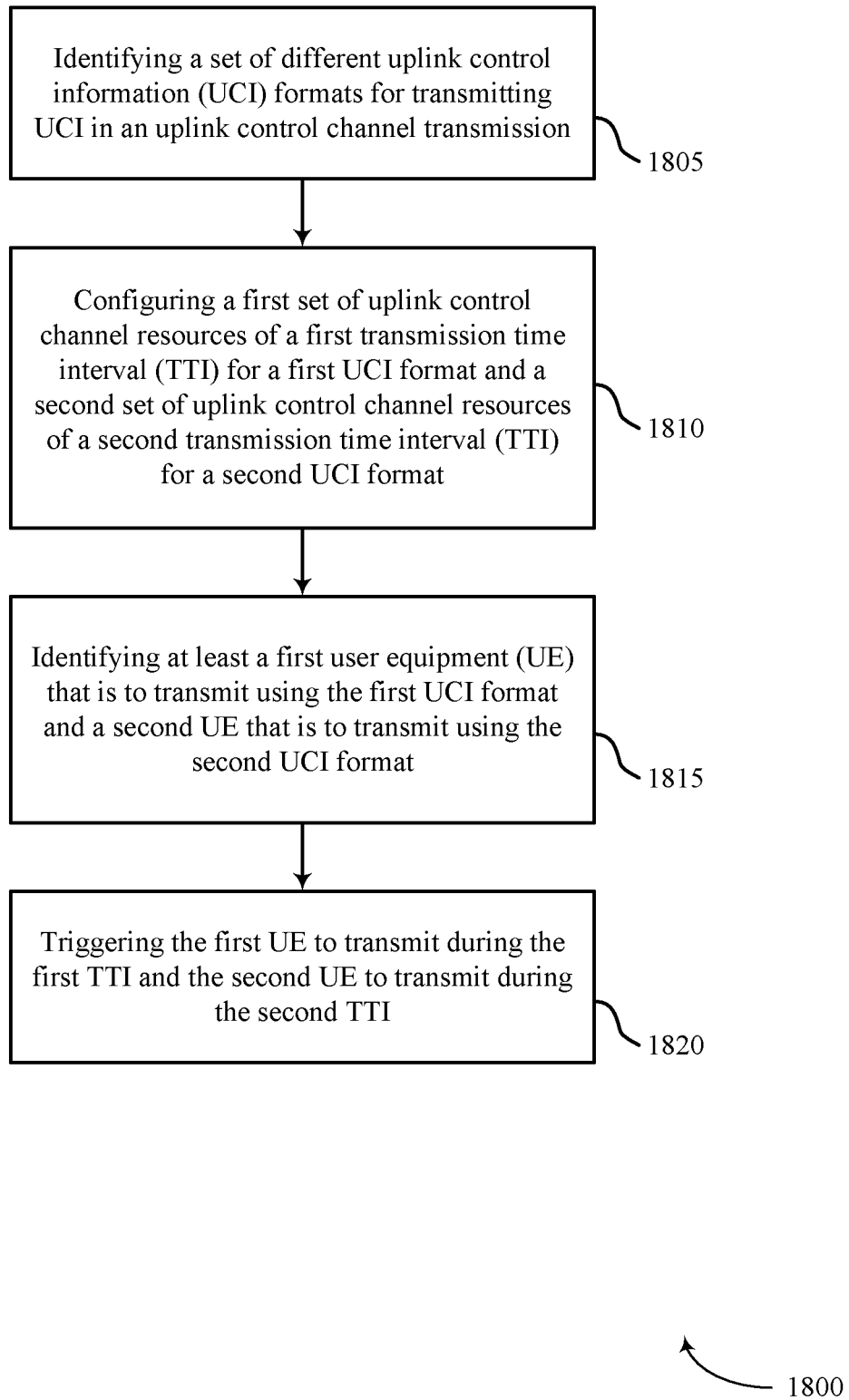

FIG. 18 shows a flowchart illustrating a method 1800 for uplink control channel transmissions in a shared radio frequency spectrum band in accordance with various aspects of the present disclosure. The operations of method 1800 may be implemented by a device such as a base station or its components as described with reference to FIGS. 1 and 2. For example, the operations of method 1800 may be performed by the base station UL transmission manager as described herein. In some examples, the base station may execute a set of codes to control the functional elements of the device to perform the functions described below. Additionally or alternatively, the base station may perform aspects the functions described below using special-purpose hardware.

At block 1805, the method 1800 may include identifying a set of different UCI formats for transmitting UCI in an uplink control channel transmission as described above with reference to FIGS. 2 through 9. In certain examples, the operations of block 1805 may be performed by the UCI format component as described with reference to FIGS. 13 and 14.

At block 1810, the method 1800 may include configuring a first set of uplink control channel resources of a first TTI for a first UCI format and a second set of uplink control channel resources of a second TTI for a second UCI format as described above with reference to FIGS. 2 through 9. In certain examples, the operations of block 1810 may be performed by the UL resource component as described with reference to FIGS. 13 and 14.

At block 1815, the method 1800 may include identifying at least a first UE that is to transmit using the first UCI format and a second UE that is to transmit using the second UCI format as described above with reference to FIGS. 2 through 9. In certain examples, the operations of block 1815 may be performed by the UE triggering component as described with reference to FIGS. 13 and 14.

At block 1820, the method 1800 may include triggering the first UE to transmit during the first TTI and the second UE to transmit during the second TTI as described above with reference to FIGS. 2 through 9. In certain examples, the operations of block 1820 may be performed by the UE triggering component as described with reference to FIGS. 13 and 14.

Figure 19:
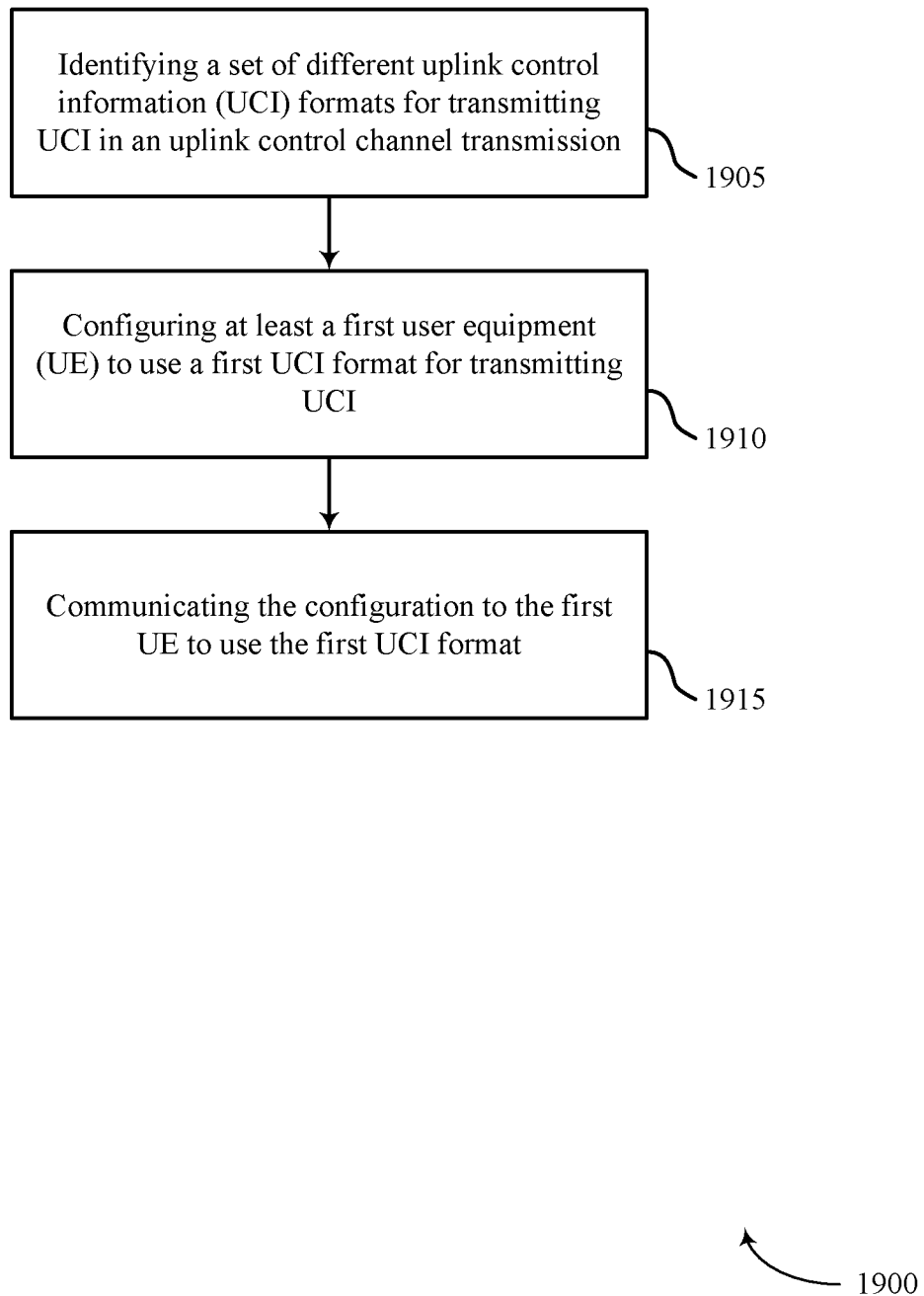

FIG. 19 shows a flowchart illustrating a method 1900 for uplink control channel transmissions in a shared radio frequency spectrum band in accordance with various aspects of the present disclosure. The operations of method 1900 may be implemented by a device such as a base station or its components as described with reference to FIGS. 1 and 2. For example, the operations of method 1900 may be performed by the base station UL transmission manager as described herein. In some examples, the base station may execute a set of codes to control the functional elements of the device to perform the functions described below. Additionally or alternatively, the base station may perform aspects the functions described below using special-purpose hardware.

At block 1905, the method 1900 may include identifying a set of different UCI formats for transmitting UCI in an uplink control channel transmission as described above with reference to FIGS. 2 through 9. In certain examples, the operations of block 1905 may be performed by the UCI format component as described with reference to FIGS. 13 and 14.

At block 1910, the method 1900 may include configuring at least a first UE to use a first UCI format for transmitting UCI as described above with reference to FIGS. 2 through 9. In certain examples, the operations of block 1910 may be performed by the UCI format component as described with reference to FIGS. 13 and 14.

At block 1915, the method 1900 may include communicating the configuration to the first UE to use the first UCI format as described above with reference to FIGS. 2 through 9. In certain examples, the operations of block 1915 may be performed by the UL communication component as described with reference to FIGS. 13 and 14.

It should be noted that these methods describe possible implementation, and that the operations and the steps may be rearranged or otherwise modified such that other implementations are possible. In some examples, aspects from two or more of the methods 1600, 1700, 1800, or 1900 described with reference to FIGS. 16-19 may be combined. It should be noted that the methods 1600-1900 are just example implementations, and that the operations of the methods 1600-1900 may be rearranged or otherwise modified such that other implementations are possible. For example, aspects of each of the methods may include steps or aspects of the other methods, or other steps or techniques described herein. Thus, aspects of the disclosure may provide for uplink control channel transmissions in a shared radio frequency spectrum band.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for uplink control channel transmissions in a shared radio frequency spectrum band. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. An apparatus for wireless communication at a user equipment (UE), comprising:
   a processor;
   memory coupled with the processor; and
   instructions stored in the memory and executable by the processor to cause the apparatus to:
      receive a configuration for a first set of uplink control channel resources for transmitting control information using a first format, the first set of uplink control channel resources corresponding to a set of frequency resource interlaces, a parameter of the configuration indicating a number of uplink control channel resources corresponding to the first set of uplink control channel resources;
receive an uplink grant for the UE to transmit the control information using the first format; and
transmit the control information using the first format and using the first number of uplink control channel resources on the set of frequency resource interlaces in accordance with the uplink grant.

2. The apparatus of claim 1, wherein the number of uplink control channel resources comprises a maximum number of uplink control channel resources corresponding to the first set of uplink control channel resources configured for the UE.

3. The apparatus of claim 1, wherein the number of uplink control channel resources correspond to a set of frequency resource interlace segments of the set of frequency resource interlaces.

4. The apparatus of claim 3, wherein each frequency resource interlace segment of the set of frequency resource interlace segments comprises a portion of resources of the set of frequency resource interlaces.

5. The apparatus of claim 1, wherein the instructions are further executable by the processor to cause the apparatus to:
receive an identifier of a first interlace and a second interlace of the set of frequency resource interlaces, the first interlace corresponding to the first set of uplink control channel resources and the second interlace corresponding a second set of uplink control channel resources.

6. The apparatus of claim 1, wherein the instructions are further executable by the processor to cause the apparatus to:
receive an indicator of a single uplink control channel resource present in the first set of uplink control channel resources.

7. The apparatus of claim 6, wherein the indicator comprises an uplink control channel resource identifier.

8. The apparatus of claim 1, wherein the first set of uplink control channel resources are in a shared radio frequency spectrum band.

9. The apparatus of claim 1, wherein the set of frequency resource interlaces comprise a set of resource blocks allocated for the control information using the first format and a second format.

10. The apparatus of claim 1, wherein the instructions are further executable by the processor to cause the apparatus to:
transmit the control information using the first format based at least in part on a number of hybrid automatic repeat request (HARQ) processes associated with the UE.

11. The apparatus of claim 1, wherein the instructions are further executable by the processor to cause the apparatus to:
receive an indication of a first interlace of the set of frequency resource interlaces to transmit hybrid automatic repeat request (HARQ); and
transmit HARQ as part of the control information using the first format on the first interlace.

12. The apparatus of claim 11, wherein the instructions to transmit HARQ are further executable by the processor to cause the apparatus to:
identify a number of hybrid automatic repeat request (HARQ) feedback bits to be included in the control information using the first format based at least in part on a number of configured component carriers, a number of HARQ processes per component carrier, or any combination thereof.

13. The apparatus of claim 1, wherein the control information using the first format is associated with a set of hybrid automatic repeat request (HARQ) feedback parameters, a scheduling request (SR), a set of channel state information (CSI) reporting parameters, or any combination thereof.

14. The apparatus of claim 1, wherein the instructions are further executable by the processor to cause the apparatus to:
identify a plurality of different control information formats for transmitting control information in an uplink control channel transmission on the set of frequency resource interlaces.

15. A method for wireless communication at a user equipment (UE), comprising:
receiving a configuration for a first set of uplink control channel resources for transmitting control information using a first format, the first set of uplink control channel resources corresponding to a set of frequency resource interlaces, a parameter of the configuration indicating a number of uplink control channel resources corresponding to the first set of uplink control channel resources;
receiving an uplink grant for the UE to transmit the control information using the first format; and
transmitting the control information using the first format using the number of uplink control channel resources on the set of frequency resource interlaces in accordance with the uplink grant.

16. The method of claim 15, wherein the number of uplink control channel resources comprises a maximum number of uplink control channel resources corresponding to the first set of uplink control channel resources configured for the UE.

17. The method of claim 15, wherein the number of uplink control channel resources correspond to a set of frequency resource interlace segments of the set of frequency resource interlaces.

18. The method of claim 17, wherein each frequency resource interlace segment of the set of frequency resource interlace segments comprises a portion of resources of the set of frequency resource interlaces.

19. The method of claim 15, further comprising:
receiving an identifier of a first interlace and a second interlace of the set of frequency resource interlaces, the first interlace corresponding to the first set of uplink control channel resources and the second interlace corresponding a second set of uplink control channel resources.

20. The method of claim 15, further comprising:
receiving an indicator of a single uplink control channel resource present in the first set of uplink control channel resources.

21. The method of claim 20, wherein the indicator comprises an uplink control channel resource identifier.

22. The method of claim 15, wherein the first set of uplink control channel resources are in a shared radio frequency spectrum band.

23. The method of claim 15, wherein the set of frequency resource interlaces comprise a set of resource blocks allocated for the control information using the first format and a second format.

24. The method of claim 15, further comprising:
transmitting the control information using the first format based at least in part on a number of hybrid automatic repeat request (HARQ) processes associated with the UE.

25. The method of claim 15, further comprising:
receiving an indication of a first interlace of the set of frequency resource interlaces to transmit hybrid automatic repeat request (HARQ); and
transmitting HARQ as part of the control information using the first format on the first interlace.

26. The method of claim 25, wherein transmitting HARQ further comprises:
identifying a number of hybrid automatic repeat request (HARQ) feedback bits to be included in the control information using the first format based at least in part on a number of configured component carriers, a number of HARQ processes per component carrier, or any combination thereof.

27. The method of claim 15, wherein the control information using the first format is associated with a set of hybrid automatic repeat request (HARQ) feedback parameters, a scheduling request (SR), a set of channel state information (CSI) reporting parameters, or any combination thereof.

28. The method of claim 15, further comprising:
identifying a plurality of different control information formats for transmitting control information in an uplink control channel transmission on the set of frequency resource interlaces.

29. An apparatus for wireless communication at a user equipment (UE), comprising:
means for receiving a configuration for a first set of uplink control channel resources for transmitting control information using a first format, the first set of uplink control channel resources corresponding to a set of frequency resource interlaces, a parameter of the configuration indicating a number of uplink control channel resources corresponding to the first set of uplink control channel resources;
means for receiving an uplink grant for the UE to transmit the control information using the first format; and
means for transmitting the control information using the first format using the first number of uplink control channel resources on the set of frequency resource interlaces in accordance with the uplink grant.

30. A non-transitory computer-readable medium storing code for wireless communication at a user equipment (UE), the code comprising instructions executable by a processor to:
receive a configuration for a first set of uplink control channel resources for transmitting control information using a first format, the first set of uplink control channel resources corresponding to a set of frequency resource interlaces, a parameter of the configuration indicating a number of uplink control channel resources corresponding to the first set of uplink control channel resources;
receive an uplink grant for the UE to transmit the control information using the first format; and
transmit the control information using the first format using the first number of uplink control channel resources on the set of frequency resource interlaces in accordance with the uplink grant.

* * * * *